(12) United States Patent
Kim et al.

(10) Patent No.: US 12,539,297 B2
(45) Date of Patent: *Feb. 3, 2026

(54) COMPOSITION FOR INHIBITING CANCER METASTASIS AND TREATING CANCER

(71) Applicant: ONCOCROSS CO., LTD., Seoul (KR)

(72) Inventors: Yi Rang Kim, Sejong (KR); Sang Yun Park, Seoul (KR); Ga Eul Yang, Gyeonggi-do (KR); Seung Jun Lee, Seoul (KR)

(73) Assignee: ONCOCROSS CO., LTD., Seoul (KR)

( * ) Notice: Subject to any disclaimer, the term of this patent is extended or adjusted under 35 U.S.C. 154(b) by 864 days.

This patent is subject to a terminal disclaimer.

(21) Appl. No.: 17/742,296

(22) Filed: May 11, 2022

(65) Prior Publication Data

US 2022/0273642 A1 Sep. 1, 2022

Related U.S. Application Data

(63) Continuation-in-part of application No. 16/484,305, filed as application No. PCT/KR2018/001549 on Feb. 6, 2018, now Pat. No. 11,364,237.

(30) Foreign Application Priority Data

Feb. 7, 2017 (KR) .................. 10-2017-0016587
Feb. 6, 2018 (KR) .................. 10-2018-0014306

(51) Int. Cl.
*A61K 31/4706* (2006.01)
*A61K 31/325* (2006.01)
*A61P 35/04* (2006.01)

(52) U.S. Cl.
CPC ........ *A61K 31/4706* (2013.01); *A61K 31/325* (2013.01); *A61P 35/04* (2018.01)

(58) Field of Classification Search
CPC ............ A61K 31/495; A61K 31/4706; A61K 31/4965; A61P 35/00
See application file for complete search history.

(56) References Cited

U.S. PATENT DOCUMENTS

| 3,214,336 | A | 10/1965 | Parker | |
|---|---|---|---|---|
| 8,901,137 | B2 | 12/2014 | Aftab et al. | |
| 11,364,237 | B2 * | 6/2022 | Kim | A61K 45/06 |
| 2013/0023488 | A1 | 1/2013 | Wu | |
| 2015/0361077 | A1 | 12/2015 | Simpson et al. | |
| 2016/0361298 | A1 | 12/2016 | Novick et al. | |

FOREIGN PATENT DOCUMENTS

| CN | 105616411 A | 6/2016 |
|---|---|---|
| CN | 105982896 A * | 10/2016 |
| JP | 2012-530697 A | 12/2012 |
| KR | 10-2014-0004771 A | 1/2014 |
| KR | 10-1859922 B1 | 5/2018 |
| WO | 2011-132171 A1 | 10/2011 |

OTHER PUBLICATIONS

Yang (Cancer Discovery vol. 4 pp. 905-913 published 2014). (Year: 2014).*
Spencer et al (Proceedings of the Society of Experimental Biology and Medicine vol. 140 pp. 1156-1161. Published 1972 (Year: 1972).*
H. J. Spencer et al., "Attenuation of Certain Neoplasias by Chlorphenesin (36631)", Proceedings of the Society for Experimental Biology and Medicine, 1972, pp. 1156-1161, vol. 140, No. 4.
Hannelore Maes et al., "Tumor Vessel Normalization by Chloroquine Independent of Autophagy", Cancer Cell, Aug. 11, 2014, pp. 190-206, vol. 26, No. 2.
International Search Report of PCT/KR2018/001549 dated Jun. 25, 2018 [PCT/ISA/210].
T. Giraldi et al., "Neutral Proteinase Inhibitors and Antimetastatic Effects in Mice", European Journal of Cancer, 1980, pp. 449-454, vol. 16, No. 4.
Written Opinion of PCT/KR2018/001549 dated Jun. 25, 2018 [PCT/ISA/237].
Chlorphenesin (Pubchem published Mar. 26, 2005) (Year: 2005).
Liang et al.(Cell and Bioscience vol. 4 pp. 1-11, Published 2014). (Year: 2014).
Jiang et al (Biomedicine and Pharmacotherapy vol. 64 pp. 609-614. Published 2010) (Year: 2010).
Ewens et al (Anticancer Research vol. 25 p. 3905-3915. Published 2005) (Year: 2005).
Thomas B. Karasic et al; "Effect of Gemcitabine and nab-Paclitaxel With or Without Hydroxychloroquine on Patients With Advanced Pancreatic Cancer—A Phase 2 Randomized Clinical Trial"; JAMA Oncology; Jul. 2019; vol. 5, No. 7: 993-998.
Office Action ("Request for the Submission of an Opinion") dated Apr. 28, 2025 in Korean Patent Application No. 10-2022-0033471.

* cited by examiner

*Primary Examiner* — George W Kosturko
(74) *Attorney, Agent, or Firm* — Sughrue Mion, PLLC

(57) ABSTRACT

The present disclosure relates to an effect of inhibiting cancer metastasis by treatment of chlorphenesin and hydroxychloroquine alone or in combination. Chlorphenesin or hydroxychloroquine has the effect of inhibiting the metastasis and invasion of cancer cells. In particular, since it was identified that a combination thereof has a synergistic action, it is possible to effectively prevent or treat cancer metastasis by administering chlorphenesin and hydroxychloroquine respectively or in combination thereof.

2 Claims, 18 Drawing Sheets

COMPOSITION FOR INHIBITING CANCER METASTASIS AND TREATING CANCER

CROSS-REFERENCE TO RELATED APPLICATIONS

The present application is a continuation-in-part of U.S. patent application Ser. No. 16/484,305, filed Aug. 7, 2019, which is a National Stage of International Application No. PCT/KR2018/001549, filed Feb. 6, 2018, which claims priority to Korean Patent Application No. 10-2017-0016587, filed Feb. 7, 2017 and Korean Patent Application No. 10-2018-0014306, filed Feb. 6, 2018, the above-noted applications incorporated herein by reference in their respective entireties.

TECHNICAL FIELD

The present disclosure relates to a composition for inhibiting cancer metastasis, and to an effect of inhibiting cancer metastasis and invasion by treatment of chlorphenesin and hydroxychloroquine alone or in combination.

BACKGROUND

Cancer is one of the diseases with high mortality worldwide. Normal cells create new cells through a series of processes of division, proliferation, and death, but problems arise in this process, causing the cells to divide abnormally, proliferate constantly, and form a new cell population. Since cancer is a disease caused by abnormal cell division and proliferation, it can develop in any tissue in the body.

Pancreatic cancer, like most cancers, has no specific symptoms in an early stage, and when it is detected after the onset of symptoms, it is common to miss the time for surgical treatment as the cancer has progressed, and it is one of the tumors that are difficult to diagnose early. Surgical resection is the only treatment method, and it is known that the number of patients who are able to undergo surgery at diagnosis is very low, about 5% to 20%. The average survival rate after surgery for pancreatic cancer is about 20% to 30%, and the 5-year average survival rate is less than 5%, which is a very poor prognosis.

Malignancies arise from an organ (such as lung, liver, kidney, stomach, colon, rectum, etc.) and spread from the place where the cancer began to another part of the body. Metastasis means that malignancies spread from the place where the cancer began to another part of the body, which is accompanied with malignant tumor progression. As the malignant tumor cell is grown and the cancer is progressed, it acquires a new genetic character that is necessary for metastasis, invades into blood vessels and lymphatic glands, circulates through them, settles down in another organ, and grows.

Currently, surgery, radiation therapy, and chemotherapy are used for cancer therapy. Among them, chemotherapy is to treat cancer with anticancer drugs. Recently, about 60 kinds of anticancer drugs are used. As much known about the cancer development and cancer cell characteristics, the new anticancer agents have actively developed. However, because the current therapy has focused on death or removal of the cancer cells, there is a lack of research on medications to prevent growth and metastasis of cancer cells, which is the immediate cause of an increase in the survival rate of the patients with cancers. In particular, metastasis, in which cancer cells move from the primary tumor site to another, is a main cause of death in cancer patients and is the biggest problem in treatment. Accordingly, to enhance cancer treatment rate and the survival rate of patients, there is a great need for developing a drug with inhibitory effects of proliferation and metastasis of cancer cells.

In this regard, the present inventors have identified that chlorphenesin and hydroxychloroquine has inhibitory effects of proliferation and metastasis of cancer cells, and their combination has a synergy effect, thereby completing the present disclosure.

RELATED ART DOCUMENT

Patent Document (Patent Document 1) Korean Patent Application Publication No. 10-2018-0014306

SUMMARY

The present disclosure has been made in an effort to provide a composition for inhibiting metastasis or invasion of cancer.

An exemplary embodiment of the present disclosure provides a pharmaceutical composition for inhibiting metastasis or invasion of cancer, in which the composition includes at least one selected from the group consisting of chlorphenesin, chlorphenesin carbamate and hydroxychloroquine, or a pharmaceutically acceptable salt thereof as an active ingredient.

Further, another exemplary embodiment of the present disclosure provides an anticancer adjuvant including at least one selected from the group consisting of chlorphenesin, chlorphenesin carbamate and hydroxychloroquine, or a pharmaceutically acceptable salt thereof as an active ingredient.

Yet another exemplary embodiment of the present disclosure provides a food composition for inhibiting proliferation or metastasis of cancer, in which the composition includes at least one selected from the group consisting of chlorphenesin, chlorphenesin carbamate and hydroxychloroquine, or a pharmaceutically acceptable salt thereof as an active ingredient.

Yet another exemplary embodiment of the present disclosure provides a pharmaceutical composition for preventing or treating cancer, in which the composition includes the pharmaceutical composition for inhibiting metastasis or invasion of cancer.

The present disclosure relates to a composition for inhibiting metastasis and invasion of cancer cells, and remarkably effective inhibition of cancer metastasis and invasion is possible by administering hydroxychloroquine alone or in combination with chlorphenesin.

DETAILED DESCRIPTION

Figure 1:
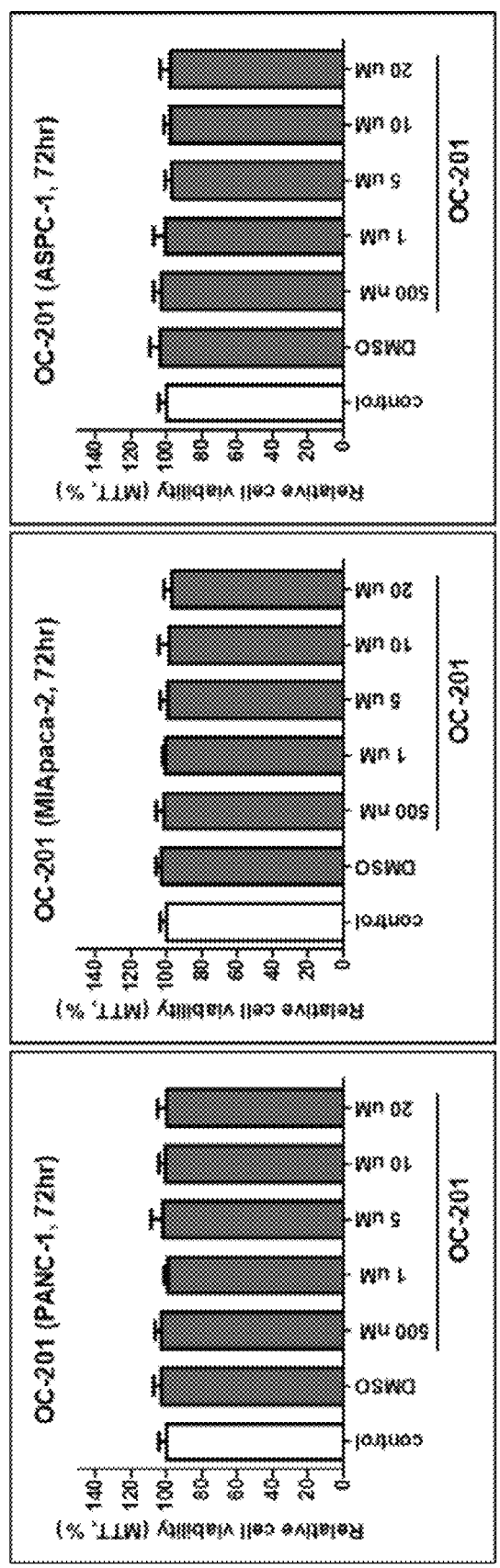
FIG. 1 is a graph showing cell survival rates of pancreatic cancer cell lines PANC-1, MIApaca-2 and ASPC-1 by chlorphenesin carbamate (OC-201).

Hereinafter, the present disclosure will be described in detail by way of embodiments of the present disclosure with reference to the accompanying drawings. However, the following examples are provided by way of illustration of the present disclosure. When it is determined that the specific description of known techniques or configuration well known to those skilled in the art unnecessarily obscure the gist of the present disclosure, the detailed description therefor may be omitted, and the present disclosure is not limited thereto. The present disclosure allows various modifications and applications within the description of the claims to be described later and the scope of equivalents interpreted therefrom.

Further, terminologies used herein are terms used to properly represent preferred examples of the present disclosure. It may vary depending on the intent of users or operators, or custom in the art to which the present disclosure belongs. Accordingly, the definitions of these terms should be based on the contents throughout this specification. In the entire specification, when a part is referred to as "comprising" a component, it means that it may further include other components without excluding other components unless specifically described otherwise.

In an aspect, the present disclosure relates to a pharmaceutical composition for inhibiting metastasis or invasion of cancer, in which the composition includes at least one selected from the group consisting of chlorphenesin, chlorphenesin carbamate and hydroxychloroquine, or a pharmaceutically acceptable salt thereof as an active ingredient.

In one embodiment, chlorphenesin may be represented by the following Chemical Formula 1, chlorphenesin carbamate may be represented by the following Chemical Formula 2, and hydroxychloroquine may be represented by the following Chemical Formula 3:

[Chemical Formula 1]

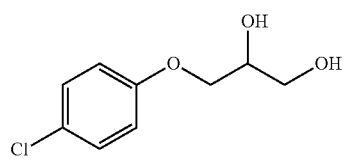

[Chemical Formula 2]

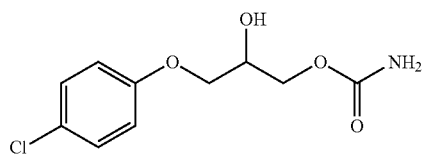

[Chemical Formula 3]

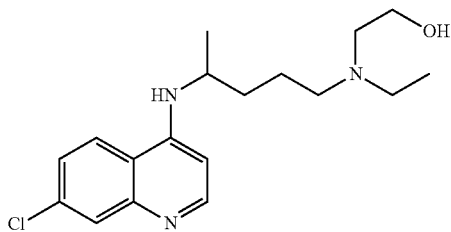

The chlorphenesin carbamate ($C_{10}H_{12}ClNO_4$, molecular weight 245.66 g/mol) (expressed as OC-201) is a drug that may be applied as a prodrug of chlorphenesin, and is a substance in which chlorine and 1,2-propanediol are attached to phenoxy. Chlorphenesin carbamate (OC-201) has been used as a muscle relaxant for the treatment of muscle pain and cramps. It is also used as a kind of cosmetic preservative effectively against bacteria and mold.

Hydroxychloroquine (expressed as HCQ) is a drug that lowers the toxicity of chloroquine, and is a preventive and therapeutic drug for malaria sold under the trade name Plaquenil. It is also used in the treatment of rheumatoid arthritis, lupus, and porphyria cutanea tarda. It is being studied as an experimental therapeutic agent for COVID-19.

Chloroquine ($C_{18}H_{26}ClN_3$, molecular weight 319.87 g/mol) (expressed as OC-202) is a 4-aminoquinoline derivative used as a therapeutic agent for malaria, rheumatoid arthritis, and lupus. It is also used to treat porphyria, solar urticaria, and vasculitis of the skin. It is known that by binding to DNA and RNA polymerase, it interferes with the metabolism of protozoa and the use of hemoglobin. It has side effects such as muscle disease, loss of appetite, diarrhea and skin rash, and is known to have side effects such as vision problems, muscle damage, and epilepsy. The chloroquine may be represented by the following Chemical Formula 4:

[Chemical Formula 4]

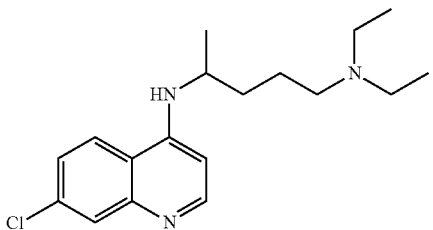

In one embodiment, the pharmaceutical composition of the present disclosure may include at least one selected from the group consisting of chlorphenesin or chlorphenesin carbamate; and hydroxychloroquine or a pharmaceutically acceptable salt thereof as an active ingredient, and may preferably include hydroxychloroquine alone; chlorphenesin and hydroxychloroquine; or chlorphenesin carbamate and hydroxychloroquine as an active ingredient. It is more preferable to include chlorphenesin or chlorphenesin carbamate and hydroxychloroquine because they have a synergistic cancer metastasis and invasion inhibitory effect.

In one embodiment, the pharmaceutical composition of the present disclosure may include 500 nM to 500 µM of chlorphenesin, chlorphenesin carbamate and hydroxychloroquine, respectively. Preferably, the pharmaceutical composition may include 500 nM to 20 µM of chlorphenesin (or chlorphenesin carbamate) and 500 nM to 20 µM of hydroxychloroquine. When chlorphenesin (or chlorphenesin carbamate) and hydroxychloroquine are included together, the pharmaceutical composition may include 5 µM or 10 µM of chlorphenesin (or chlorphenesin carbamate) and 500 nM to 20 µM of hydroxychloroquine. In an example of the present disclosure, chlorphenesin and hydroxychloroquine of the present disclosure inhibits the migration and invasion of cancer cells without significant cytotoxicity in the above-described range of concentration in cell experiments.

In an example of the present disclosure, hydroxychloroquine of the present disclosure has similar or somewhat low cancer metastasis and invasion inhibitory effects to chloroquine, which has been identified to have cancer metastasis inhibitory effects in previous studies. However, it was identified that when chlorphenesin (or chlorphenesin carbamate) and hydroxychloroquine were combined in combination, they had a synergistic effect in inhibiting cancer metastasis and invasion, which was better than a combination of chlorphenesin and chloroquine.

In one embodiment, the cancer may be a solid cancer, for example, at least one selected from the group consisting of brain tumor, melanoma, myeloma, non-small cell lung cancer, oral cancer, liver cancer, gastric cancer, colon cancer, breast cancer, lung cancer, bone cancer, pancreatic cancer, skin cancer, head or neck cancer, cervical cancer, ovarian cancer, colorectal cancer, small intestine cancer, rectal cancer, fallopian tube carcinoma, perianal cancer, endometrial carcinoma, vaginal carcinoma, vulvar carcinoma, Hodgkin's disease, esophageal cancer, lymph node cancer, bladder cancer, biliary tract cancer (gallbladder and biliary tract cancer), endocrine gland cancer, thyroid cancer, parathyroid gland cancer, adrenal cancer, soft tissue sarcoma, urethra cancer, phallus cancer, prostate cancer, chronic or acute leukemia, lymphocytic lymphoma, kidney or ureteral cancer, kidney cell carcinoma, kidney pelvic carcinoma, central nervous system tumors, primary central nervous system lymphoma, spinal cord tumor, brainstem glioma and pituitary adenoma. More preferably, the cancer may be colorectal cancer, pancreatic cancer or biliary tract cancer, and pancreatic cancer is particularly preferable.

One embodiment of the present disclosure identified a cancer cell metastasis and invasion inhibitory effect of each of chlorphenesin and hydroxychloroquine for human-derived pancreatic carcinoma cell line Panc-1, human-derived pancreatic cancer cell line Aspc-1, and human-derived pancreatic cancer cell line MIAPaCA2, and a cancer cell metastasis and invasion inhibitory effect by combination treatment according to the combination therefor.

The present disclosure includes chlorphenesin, chlorphenesin carbamate and hydroxychloroquine represented by the Chemical Formulas 1 to 3 as well as all their pharmaceutically acceptable salts and possible solvates, hydrates, racemates, stereoisomers, or prodrugs thereof.

The chlorphenesin and hydroxychloroquine represented by the Chemical Formulas 1 and 3 of the present disclosure may be used in the form of a pharmaceutically acceptable salt, and acid addition salts formed by a pharmaceutically acceptable free acid are useful as a salt. The acid addition salt is obtained from an inorganic acid such as hydrochloric acid, nitric acid, phosphoric acid, sulfuric acid, hydrobromic acid, hydroiodic acid, nitrous acid or phosphorous acid, or a non-toxic organic acid such as aliphatic mono or dicarboxylate, phenyl-substituted alkanoate, hydroxyalkanoate and alkanedioate, an aromatic acid, aliphatic and aromatic sulfonic acid. Such pharmaceutically non-toxic salt includes sulfate, pyrosulfate, bisulfate, sulfite, bisulfite, nitrate, phosphate, monohydrogen phosphate, dihydrogen phosphate, metaphosphate, pyrophosphate chloride, bromide, iodide, fluoride, acetate, propionate, decanoate, caprylate, acrylate, formate, isobutyrate, caprate, heptanoate, propiolate, oxalate, malonate, succinate, suberate, sebacate, fumarate, maleate, butyne-1,4-dioate, hexane-1,6-dioate, benzoate, chlorobenzoate, methylbenzoate, dinitrobenzoate, hydroxybenzoate, methoxybenzoate, phthalate, terephthalate, benzene sulfonate, toluene sulfonate, chlorobenzene sulfonate, xylene sulfonate, phenylacetate, phenylpropionate, phenylbutyrate, citrate, lactate, hydroxybutyrate, glycolate, maleate, tartrate, methanesulfonate, propanesulfonate, naphthalene-1-sulfonate, naphthalene-2-sulfonate, or mandelate.

The acid addition salt according to the present disclosure may be prepared by the conventional method, for example, by dissolving chlorphenesin and hydroxychloroquine represented by Chemical Formulas 1 and 3 in an excessive amount of an aqueous acid solution and then precipitating the resulting salts using water-miscible organic solvent, for example, methanol, ethanol, acetone, or acetonitrile. Further, the acid addition salt may be prepared by evaporating a solvent or an excess acid in the mixture followed by performing dry or by suction-filtrating the precipitated salt.

In addition, the pharmaceutically acceptable metal salt may be prepared using a base. An alkali metal or alkali earth metal salt is obtained by, for example, dissolving a compound in an excessive amount of an alkali metal hydroxide or alkali earth metal hydroxide solution, filtering an undissolved compound salt, and evaporating and drying the filtrate. Here, the metal salt considered suitable for pharmaceutical use is a sodium salt, a potassium salt or a calcium salt. Further, a silver salt corresponding thereto is obtained by reacting a salt of an alkali metal or alkali earth metal with a suitable silver salt (e.g., silver nitrate).

In one embodiment, hydroxychloroquine may be used in the form of a prodrug of hydroxychloroquine sulfate ($C_{18}H_{26}ClN_3O \cdot H_2SO_4$, molecular weight 433.95 g/mol) represented by the following Chemical Formula 5:

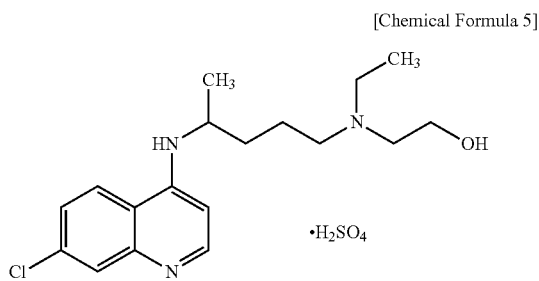

[Chemical Formula 5]

The pharmaceutical composition of the present disclosure may further include known cancer metastasis inhibitors in addition to chlorphenesin and hydroxychloroquine as active ingredients, and may be used in combination with other treatments known for the treatment of these diseases. Other treatments include, but are not limited to, chemotherapy, radiation therapy (X-ray irradiation and γ-ray irradiation, etc.), hormone therapy, bone marrow transplantation, stem cell replacement therapy, other biological therapies, immunotherapy, and the like.

The term "therapeutically effective amount" used in combination with the active ingredient in the present disclosure refers to an amount effective to prevent or treat a subject disease, and the therapeutically effective amount of the composition of the present disclosure may be determined by various factors, for example, administration method, target site, the patient's condition, and the like. Therefore, the dosage when used in the human body should be determined in appropriate amounts in consideration of safety and efficacy. It is also possible to estimate the amount used in humans from the effective amount determined by animal experiments. These matters to be considered in determining the effective amount are described in, for example, Hardman and Limbird, eds., Goodman and Gilman's The Pharmacological Basis of Therapeutics, 10th ed. (2001), Pergamon Press; and E. W. Martin ed., Remington's Pharmaceutical Sciences, 18th ed. (1990), Mack Publishing Co.

The pharmaceutical composition of the present disclosure is administered in a pharmaceutically effective amount. The term "pharmaceutically effective amount" used herein refers to an amount sufficient to treat the disease at a reasonable benefit/risk ratio applicable for medical treatment and an amount that does not cause side effects. The level of an effective dosage may be determined by parameters including a health status of the patient, the kind of cancer, severity, the activity of a drug, sensitivity to a drug, an administration method, administration time, an administration route and a release rate, duration of treatment, formulated or co-used drugs, and other parameters well known in medical fields. The composition of the present disclosure may be administered as an individual therapeutic agent or in combination with other therapeutic agents. It may be administered sequentially or simultaneously with a conventional therapeutic agent or administered in a single or multiple dose regime. In consideration of all of the above factors, it is important to administer such a dose as to obtain a maximum effect with a minimal amount without a side effect and the dose may be easily determined by those skilled in the art.

The pharmaceutical compositions of the present disclosure may include carriers, diluents, excipients, or a combination of two or more thereof commonly used in biological formulations. The term "pharmaceutically acceptable" as used herein means that the composition is free of toxicity to cells or humans exposed to the composition. The carrier is not particularly limited as long as it is suitable for the delivery of the composition to the living body. For example, compounds, saline solutions, sterile water, Ringer's solution, buffered saline, dextrose solution, maltodextrin solution, glycerol, ethanol disclosed in Merck Index, 13th ed., Merck & Co. Inc. and one or more ingredients thereof may be mixed and used. If necessary, conventional additives such as antioxidants, buffers, bacteriostatic agents may be added. The composition may also be formulated into dosage form for injection such as aqueous solution, suspension, or emulsion, pills, capsules, granules, or tablets by additionally including diluents, dispersant, surfactant, binder and lubricant. Further, the composition may be formulated into a desirable form depending on targeting disease or ingredients thereof, using the method disclosed in Remington's Pharmaceutical Science (Mack Publishing Company, Easton PA., 18th, 1990).

In one embodiment, the pharmaceutical composition may be one or more formulations selected from the group consisting of oral formulations, external preparations, suppositories, sterile injectable solutions and sprays, and more preferably oral formations or injectable formulations.

The composition of the present disclosure may also include also include carriers, diluents, excipients, or a combination of two or more thereof commonly used in biological formulations. The pharmaceutically acceptable carrier is not particularly limited as long as it is suitable for the delivery of the composition to the living body. For example, compounds, saline solutions, sterile water, Ringer's solution, buffered saline, dextrose solution, maltodextrin solution, glycerol, ethanol disclosed in Merck Index, 13th ed., Merck & Co. Inc. and one or more ingredients thereof may be mixed and used. If necessary, conventional additives such as antioxidants, buffers, bacteriostatic agents may be added. The composition may also be formulated into dosage form for injection such as aqueous solution, suspension, or emulsion, pills, capsules, granules, or tablets by additionally including diluents, dispersant, surfactant, binder and lubricant. Further, the composition may be formulated into a desirable form depending on each disease or ingredient, using an appropriate method in the art or a method disclosed in Remington's Pharmaceutical Science (Mack Publishing Company, Easton PA., 18th, 1990).

The term "administration" as used herein means providing a predetermined substance to a subject or a patient by any appropriate method and may be administered orally or parenterally (for example, by applying in injectable formulations intravenously, subcutaneously, intraperitoneally, or topically) according to a desired method. The dosage may vary depending on the patient's body weight, age, gender, health condition, diet, administration time, administration method, excretion rate, the severity of the disease and the like. The liquid formulations for oral administration of the composition of the present disclosure include suspensions, oral liquids, emulsions, syrups and the like. In addition to water and liquid paraffin which are simple diluents commonly used, various excipients such as wetting agents, sweeteners, flavors, preservatives and the like may be included. Formulations for parenteral administration include sterile aqueous solutions, non-aqueous solvents, suspensions, emulsions, freeze-dried formulations, suppositories, and the like. The pharmaceutical composition of the present disclosure may be administered by any device capable of moving the active substance to target cells. The preferred administration method and formulations include intravenous, subcutaneous, intradermal, intramuscular, drip injections and the like. The injectable solution may be prepared using an aqueous solvent such as a physiological saline solution and Ringer's solution and a non-aqueous solvent such as a vegetable oil, a higher fatty acid ester (e.g., ethyl oleate), an alcohol (e.g., ethanol, benzyl alcohol, propylene glycol, glycerin, etc.) and may include pharmaceutical carriers such as stabilizer to prevent deterioration (e.g., ascorbic acid, sodium hydrogen sulfite, sodium pyrosulfite, BHA, tocopherol, EDTA, etc.), an emulsifier, a buffer for pH control, preservatives for inhibition of microbial growth (e.g., phenylmercuric nitrate, thimerosal, benzalkonium chloride, phenol, cresol, benzyl alcohol, etc.).

The term "subject" as used herein means all animals who have developed the cancer or are capable of developing the cancer, including human, a monkey, a cow, a horse, a sheep, a pig, a chicken, a turkey, a quail, a cat, a dog, a mouse, a rat, a rabbit or a guinea pig. These diseases may be effectively prevented or treated by administering the pharmaceutical composition of the present disclosure to a subject. The pharmaceutical composition of the present disclosure may be administered in combination with conventional therapeutic agents.

The composition of the present disclosure may additionally contain one or more active ingredients exhibiting the same or similar function. The composition of the present disclosure includes 0.0001 to 10% by weight of the protein, preferably 0.001 to 1% by weight, based on the total weight of the composition.

The pharmaceutical composition of the present disclosure may further include a pharmaceutically acceptable additive, which is exemplified by starch, gelatinized starch, microcrystalline cellulose, milk sugar, povidone, colloidal silicon dioxide, calcium hydrogen phosphate, lactose, mannitol, taffy, Arabia rubber, pregelatinized starch, corn starch, cellulose powder, hydroxypropyl cellulose, Opadry, sodium starch glycolate, carnauba wax, synthetic aluminum silicate, stearic acid, magnesium stearate, aluminum stearate, calcium stearate, white sugar, dextrose, sorbitol, talc, etc. The pharmaceutically acceptable additive of the present disclosure is preferably added to the composition in an amount of 0.1 to 90 parts by weight, but is not limited thereto.

The composition of the present disclosure may be administered orally or parenterally (for example, by applying intravenously, subcutaneously, intraperitoneally, or topically) according to a desired method. The effective dosage of the composition may be determined according to weight, age, gender, health condition, diet, administration frequency, administration method, excretion and severity of a disease. The dosage is 0.0001 mg/ml to 50 mg/ml per day and preferably 0.0001 mg/ml to 30 mg/ml per day, and administration frequency is once a day or preferably a few times a day.

In an aspect, the present disclosure relates to an anticancer adjuvant including at least one selected from the group consisting of chlorphenesin, chlorphenesin carbamate and hydroxychloroquine, or a pharmaceutically acceptable salt thereof as an active ingredient.

In one embodiment, the anticancer adjuvant of the present disclosure may include at least one selected from the group consisting of chlorphenesin or chlorphenesin carbamate; and hydroxychloroquine or a pharmaceutically acceptable salt thereof as an active ingredient, and may preferably include hydroxychloroquine alone; chlorphenesin and hydroxychloroquine; or chlorphenesin carbamate and hydroxychloroquine as an active ingredient. It is more preferable to include chlorphenesin or chlorphenesin carbamate and hydroxychloroquine because they have a synergistic cancer metastasis and invasion inhibitory effect.

In one embodiment, the anticancer adjuvant of the present disclosure may include 500 nM to 500 µM of chlorphenesin, chlorphenesin carbamate and hydroxychloroquine, respectively. Preferably, the pharmaceutical composition may include 500 nM to 20 µM of chlorphenesin (or chlorphenesin carbamate) and 500 nM to 20 µM of hydroxychloroquine. When chlorphenesin (or chlorphenesin carbamate) and hydroxychloroquine are included together, the pharmaceutical composition may include 5 µM or 10 µM of chlorphenesin (or chlorphenesin carbamate) and 500 nM to 20 µM of hydroxychloroquine.

The pharmaceutical composition or anticancer adjuvant of the present disclosure may further include the known anticancer agent in addition to chlorphenesin and hydroxychloroquine as active ingredients, and may be used in combination with other treatments known for the treatment of these diseases. Other treatments include, but are not limited to, chemotherapy, radiation therapy, hormone therapy, bone marrow transplantation, stem cell replacement therapy, other biological therapies, immunotherapy, and the like.

In one embodiment, the pharmaceutical composition or anticancer adjuvant of the present disclosure may be administered in combination with an anticancer agent.

In one embodiment, the pharmaceutical composition or anticancer adjuvant of the present disclosure may be administered simultaneously, separately, or sequentially with an anticancer agent.

In one embodiment, the examples of anticancer agents include DNA alkylating agents such as mechloethamine, chlorambucil, phenylalanine, mustard, cyclophosphamide, ifosfamide, carmustine (BCNU), lomustine (CCNU), streptozotocin, busulfan, thiotepa, cisplatin and carboplatin; anticancer antibiotics such as dactinomycin (actinomycin D), doxorubicin (adriamycin), daunorubicin, idarubicin, mitoxantrone, plicamycin, mitomycin C and bleomycin; plant alkaloids such as vincristine, vinblastine, paclitaxel, docetaxel, etoposide, teniposide, topotecan and iridotecan; and others including dacomitinib, osimertinib, cetuximab, Pyrotinib, Lcotinib, panitumumab, zalutumumab, Nimotuzumab, matuzumab, gefitinib, erlotinib, Lapatinib, neratinib, vandetanib, necitumumab, or afatinib, but are not limited thereto.

As used herein, the term "anti-cancer adjuvant" means an agent capable of improving, enhancing or increasing the anticancer effect of an anticancer agent. When the anticancer adjuvant is used alone, the anticancer adjuvant does not exhibit anticancer activity. However, when the anticancer adjuvant is used in combination with an anticancer agent, the anticancer adjuvant may improve, enhance or increase the anticancer effect of the anticancer agent. In addition, when an agent exhibiting a concentration-dependent anticancer activity is used in combination with an anticancer agent at a level that the agent itself does not exhibit anticancer activity, the anticancer adjuvant may improve, enhance or increase the anticancer effect of the anticancer agent.

The anticancer adjuvant may be administered via any of the common routes, as long as it is able to reach a target tissue. The anticancer adjuvant of the present disclosure may be administered according to the intended purposes via intraperitoneal, intravenous, intramuscular, subcutaneous, intradermal, oral, intranasal, intrapulmonary, or intrarectal administration, but the administration routes are not limited thereto. Additionally, the anticancer adjuvant may be administered using any device capable of transferring the active material to the target cells.

In an aspect, the present disclosure relates to a food composition for inhibiting metastasis or invasion of cancer, in which the composition includes at least one selected from the group consisting of chlorphenesin, chlorphenesin carbamate and hydroxychloroquine, or a food acceptable salt thereof as an active ingredient.

In one embodiment, the food composition of the present disclosure may include at least one selected from the group consisting of chlorphenesin or chlorphenesin carbamate; and hydroxychloroquine or a food acceptable salt thereof as an active ingredient, and may preferably include hydroxychloroquine alone; chlorphenesin and hydroxychloroquine; or chlorphenesin carbamate and hydroxychloroquine as an active ingredient. It is more preferable to include chlorphenesin or chlorphenesin carbamate; and hydroxychloroquine because they have a synergistic cancer metastasis and invasion inhibitory effect.

In one embodiment, the cancer may be at least one selected from the group consisting of brain tumor, melanoma, myeloma, non-small cell lung cancer, oral cancer, liver cancer, gastric cancer, colon cancer, breast cancer, lung cancer, bone cancer, pancreatic cancer, skin cancer, head or neck cancer, cervical cancer, ovarian cancer, colorectal cancer, small intestine cancer, rectal cancer, fallopian tube carcinoma, perianal cancer, endometrial carcinoma, vaginal carcinoma, vulvar carcinoma, Hodgkin's disease, esophageal cancer, lymph node cancer, bladder cancer, biliary tract cancer (gallbladder and biliary tract cancer), endocrine gland cancer, thyroid cancer, parathyroid gland cancer, adrenal cancer, soft tissue sarcoma, urethra cancer, phallus cancer, prostate cancer, chronic or acute leukemia, lymphocytic lymphoma, kidney or ureteral cancer, kidney cell carcinoma, kidney pelvic carcinoma, central nervous system tumors, primary central nervous system lymphoma, spinal cord tumor, brainstem glioma and pituitary adenoma. More preferably, the cancer may be colorectal cancer, pancreatic cancer or biliary tract cancer, and pancreatic cancer is particularly preferable.

When the composition of the present disclosure is used as a food composition, the chlorphenesin, chlorphenesin carbamate and hydroxychloroquine may be added as it is or may be used together with other food or food ingredients, and may be appropriately used according to a conventional method. The composition may include a sitology-acceptable food-aid additive in addition to the active ingredients, and the mixed amount of the active ingredient may be suitably determined according to the intended use (prevention, health or therapeutic treatment).

The term "food-aid additive" as used herein refers to a component which may be added to foods subsidiarily and may be appropriately selected and used by those skilled in the art as added to the preparation of health functional foods of each formulation. Examples of food-aid additives include various nutrients, vitamins, minerals (electrolytes), flavors such as synthetic flavors and natural flavors, colorants and fillers, pectic acid and its salts, alginic acid and its salts, organic acids, protective colloid thickeners, pH adjusting agents, stabilizers, preservatives, glycerin, alcohols, and carbonating agents used in carbonated drinks. However, the types of food aid additives of the present disclosure are not limited by these examples.

A health functional food may be included in the food composition of the present disclosure. The term "health functional food" as used herein refers to a food prepared and processed in the form of tablets, capsules, powders, granules, liquids and pills using raw materials and components having useful functions in the human body. Here, "functional" means to obtain beneficial effects for health use such as controlling nutrients or physiological action for the structure and function of the human body. The health functional food of the present disclosure may be prepared by a method commonly used in the art and may be prepared by adding raw materials and components which are usually added in the conventional technical fields at the time of the preparation. Further, the formulations of the above health functional foods may also be prepared without limitations as long as formulations recognized as health functional foods. The food composition of the present disclosure may be prepared in various forms, and unlike general pharmaceuticals, it has the advantage that there is no side effect that may occur when a drug is used for a long period of time because it uses food as a raw material, and is excellent in portability, so that the health functional food of the present disclosure may be ingested as an adjuvant to enhance the effectiveness of anticancer drugs.

In addition, there is no limitation on the kind of health food to which the composition of the present disclosure may be used. Moreover, the composition including chlorphenesin, chlorphenesin carbamate or hydroxychloroquine of the present disclosure as an active ingredient may be prepared by mixing other suitable auxiliary ingredients and known additives, which may be contained in health functional foods, according to the selection of those skilled in the art. Examples of foods that may be added include meat, sausage, bread, chocolates, candies, snacks, confectionery, pizza, ramen, other noodles, gums, dairy products such as ice cream, various soups, beverages, tea, drinks, alcohol drinks, vitamin complex, and the like, and may be prepared by adding to the juice, tea, jelly, and juice prepared from the extract of the present disclosure as a main component.

In an aspect, the present disclosure relates to a pharmaceutical composition for preventing or treating cancer, in which the composition includes a pharmaceutical composition for inhibiting metastasis or invasion of cancer, and includes at least one selected from the group consisting of chlorphenesin, chlorphenesin carbamate and hydroxychloroquine, or a pharmaceutically acceptable salt thereof as an active ingredient.

The term "prevention" used herein refers to all types of actions that inhibit or delay the development, spread and recurrence of cancer by administration of the pharmaceutical composition according to the present disclosure, and the term "treatment" used herein refers to all types of actions that improve or alter the death of cancer cells or symptoms of cancer by the administration of the composition including at least one selected from the group consisting of chlorphenesin and hydroxychloroquine or a pharmaceutically acceptable salt thereof according to the present disclosure. Those skilled in the art may appreciate the exact criteria of the disease on which the compositions herein have effects and determine the extent of improvement, enhancement, and treatment with reference to the data presented by the Korean Academy of Medical Sciences, etc.

In one embodiment, the pharmaceutical composition of the present disclosure may be a pharmaceutical composition for preventing or treating metastatic cancer or cancer metastasis.

In one embodiment, the pharmaceutical composition of the present disclosure may include at least one selected from the group consisting of chlorphenesin or chlorphenesin carbamate; and hydroxychloroquine or a food acceptable salt thereof as an active ingredient, and may preferably include hydroxychloroquine alone; chlorphenesin and hydroxychloroquine; or chlorphenesin carbamate and hydroxychloroquine as an active ingredient. It is more preferable to include chlorphenesin or chlorphenesin carbamate; and hydroxychloroquine because they have a synergistic cancer metastasis and invasion inhibitory effect.

In one embodiment, the cancer may be at least one selected from the group consisting of brain tumor, melanoma, myeloma, non-small cell lung cancer, oral cancer, liver cancer, gastric cancer, colon cancer, breast cancer, lung cancer, bone cancer, pancreatic cancer, skin cancer, head or neck cancer, cervical cancer, ovarian cancer, colorectal cancer, small intestine cancer, rectal cancer, fallopian tube carcinoma, perianal cancer, endometrial carcinoma, vaginal carcinoma, vulvar carcinoma, Hodgkin's disease, esophageal cancer, lymph node cancer, bladder cancer, biliary tract cancer (gallbladder and biliary tract cancer), endocrine gland cancer, thyroid cancer, parathyroid gland cancer, adrenal cancer, soft tissue sarcoma, urethra cancer, phallus cancer, prostate cancer, chronic or acute leukemia, lymphocytic lymphoma, kidney or ureteral cancer, kidney cell carcinoma, kidney pelvic carcinoma, central nervous system tumors, primary central nervous system lymphoma, spinal cord tumor, brainstem glioma and pituitary adenoma. More preferably, the cancer may be colorectal cancer, pancreatic cancer or biliary tract cancer, and pancreatic cancer is particularly preferable.

The pharmaceutical composition of the present disclosure may further include known anticancer drugs in addition to chlorphenesin, chlorphenesin carbamate and hydroxychloroquine as active ingredients, and may be used in combination with other treatments known for the treatment of these diseases. Other treatments include, but are not limited to, chemotherapy, radiation therapy, hormone therapy, bone marrow transplantation, stem cell replacement therapy, other biological therapies, immunotherapy, and the like.

Examples of anticancer agents that may be included in the pharmaceutical composition of the present disclosure include DNA alkylating agents such as mechloethamine, chlorambucil, phenylalanine, mustard, cyclophosphamide, ifosfamide, carmustine (BCNU), lomustine (CCNU), streptozotocin, busulfan, thiotepa, cisplatin and carboplatin; anticancer antibiotics such as dactinomycin (actinomycin D), doxorubicin (adriamycin), daunorubicin, idarubicin, mitoxantrone, plicamycin, mitomycin C and bleomycin; plant alkaloids such as vincristine, vinblastine, paclitaxel, docetaxel, etoposide, teniposide, and iridotecan; and others including dacomitinib, osimertinib, cetuximab, Pyrotinib, Leotinib, panitumumab, zalutumumab, Nimotuzumab, matuzumab, gefitinib, erlotinib, Lapatinib, neratinib, vandetanib, necitumumab, or afatinib, but are not limited thereto.

The present disclosure is described in more detail with reference to the following Examples. However, the following Examples are only for the purpose of illustrating the present disclosure, and thus the present disclosure is not limited thereto.

Example 1. Identification of Cytotoxicity 1-1. Cytotoxicity of Chlorphenesin

In order to identify the effect of single administration of chlorphenesin on the survival rate of pancreatic cancer cells, cell survival rate was evaluated for the pancreatic cancer cell lines PANC-1, MIApaca-2 and ASPC-1 by MTT assay (Promega, Ltd.) according to the manufacturer's protocol, by using chlorphenesin carbamate (OC-201), a prodrug drug with improved stability that may exert the same pharmacological action and the same effect in vivo as an active ingredient equivalent to chlorphenesin, instead of chlorphenesin.

Each pancreatic cancer cell line was inoculated in a 96-well plate at a density of $5 \times 10^3$ cells per well and pre-treated with 0 μM (control: DMSO treatment), 500 nM, 1 μM, 5 μM, 10 μM, and 2 μM of chlorphenesin carbamate (OC-201) for 72 hours, respectively. The pre-treated cells were incubated with 5 mg/mL MTT for 4 hours. Thereafter, the medium was removed, and 150 μL of the solubilization solution and the stop solution were added, followed by incubation at 30° C. for 4 hours. The absorbance of the reaction solution was measured at 570 nm. The cell survival rate was calculated using the following Equation 1.

Cell survival rate=absorbance of experimental group (at 570 nm)/absorbance of control (at 570 nm)× 100(%)  [Equation 1]

As a result, toxicity by chlorphenesin carbamate (OC-201) was not observed even at a high concentration of 20 μM even after 72 hours had elapsed after chlorphenesin carbamate treatment in all three types of pancreatic cancer cell lines (FIG. 1).

1-2. Cytotoxicity of Chloroquine and Hydroxychloroquine

In order to identify the effect of single administration of chloroquine (OC-202) and hydroxychloroquine (HCQ) on the survival rate of pancreatic cancer cells, cell survival rate was evaluated for the pancreatic cancer cell lines PANC-1, MIApaca-2 and ASPC-1 by MTT assay (Promega, Ltd.) according to the manufacturer's protocol.

Each pancreatic cancer cell line was inoculated in a 96-well plate at a density of $5 \times 10^3$ cells per well and pre-treated with 0 μM (control: DMSO treatment), 500 nM, 1 μM, 5 μM, 10 μM, and 2 μM of chloroquine (OC-202) or hydroxychloroquine (HCQ) for 72 hours, respectively. The pre-treated cells were incubated with 5 mg/mL MTT for 4 hours. Thereafter, the medium was removed, and 150 μL of the solubilization solution and the stop solution were added, followed by incubation at 30° C. for 4 hours. The absorbance of the reaction solution was measured at 570 nm. The cell survival rate was calculated using the above Equation 1.

Figure 2:
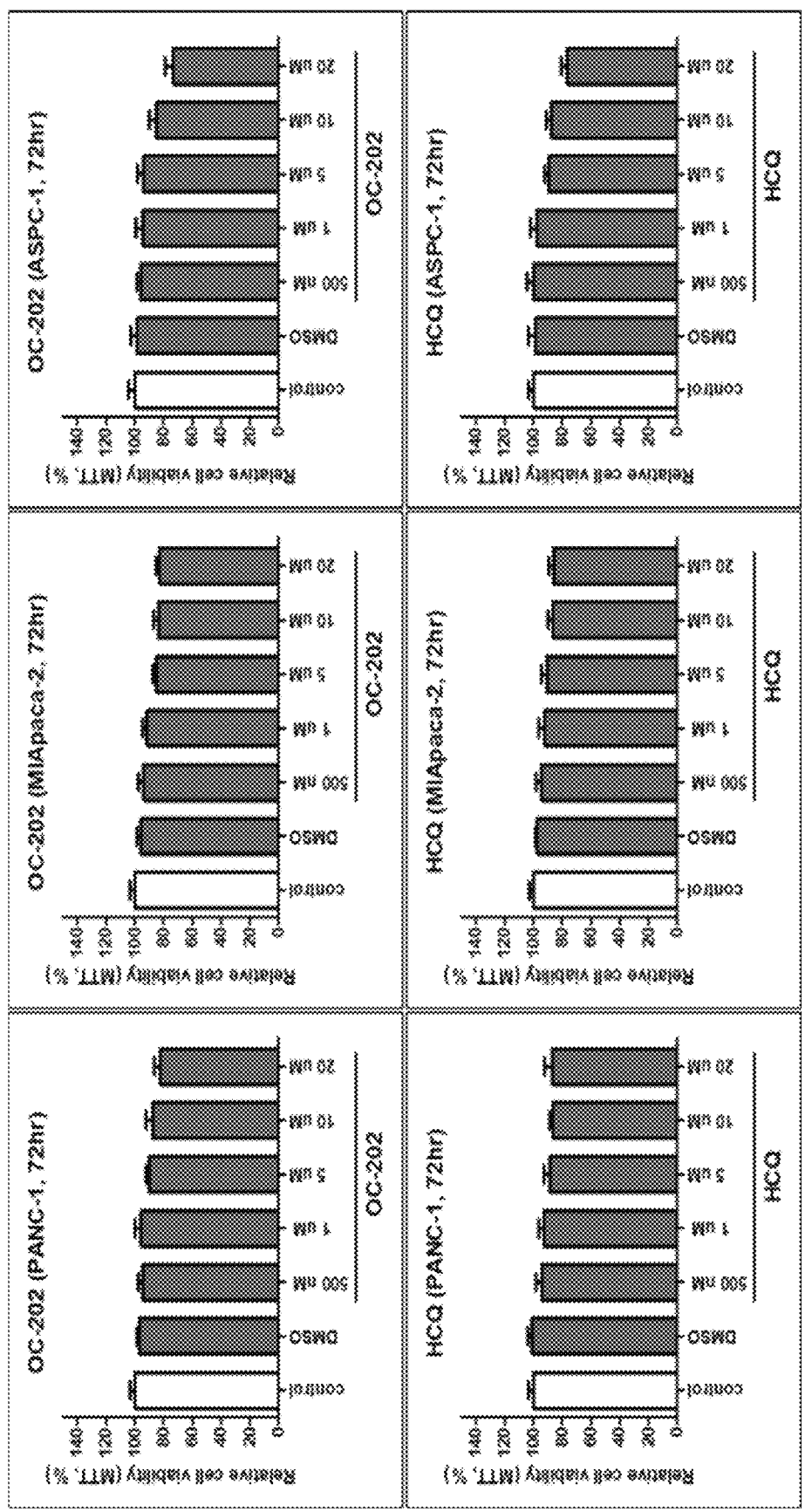
FIG. 2 is a graph showing cell survival rates of pancreatic cancer cell lines PANC-1, MIApaca-2 and ASPC-1 by chloroquine (OC-202) and hydroxychloroquine (HCQ), respectively.

As a result of measuring the cell survival rate after 72 hours of treatment with chloroquine and hydroxychloroquine from 500 nM to 20 μM in three types of pancreatic cancer cell lines, it was identified that both drugs did not show significant toxicity up to a high concentration of 20 μM (FIG. 2).

1-3. Cytotoxicity by Combination Administration

In order to identify the cytotoxicity of pancreatic cancer cells by combination treatment of chlorphenesin carbamate (OC-201) and chloroquine (OC-202) or hydroxychloroquine (HCQ), cell survival rate was evaluated for the pancreatic cancer cell lines PANC-1, MIApaca-2 and ASPC-1 by MTT assay (Promega, Ltd.) according to the manufacturer's protocol.

Each pancreatic cancer cell line was inoculated in a 96-well plate at a density of $5 \times 10^3$ cells per well and pre-treated with 5 μM or 10 μM of chlorphenesin carbamate (OC-201) and 0 μM (control: DMSO treatment), 500 nM, 1 μM, 5 μM, 10 μM, or 2 μM of chloroquine (OC-202) or hydroxychloroquine (HCQ) for 72 hours, respectively. The pre-treated cells were incubated with 5 mg/mL MTT for 4 hours. Thereafter, the medium was removed, and 150 μL of the solubilization solution and the stop solution were added, followed by incubation at 30° C. for 4 hours. The absorbance of the reaction solution was measured at 570 nm. The cell survival rate was calculated using the above Equation 1.

Figure 3:
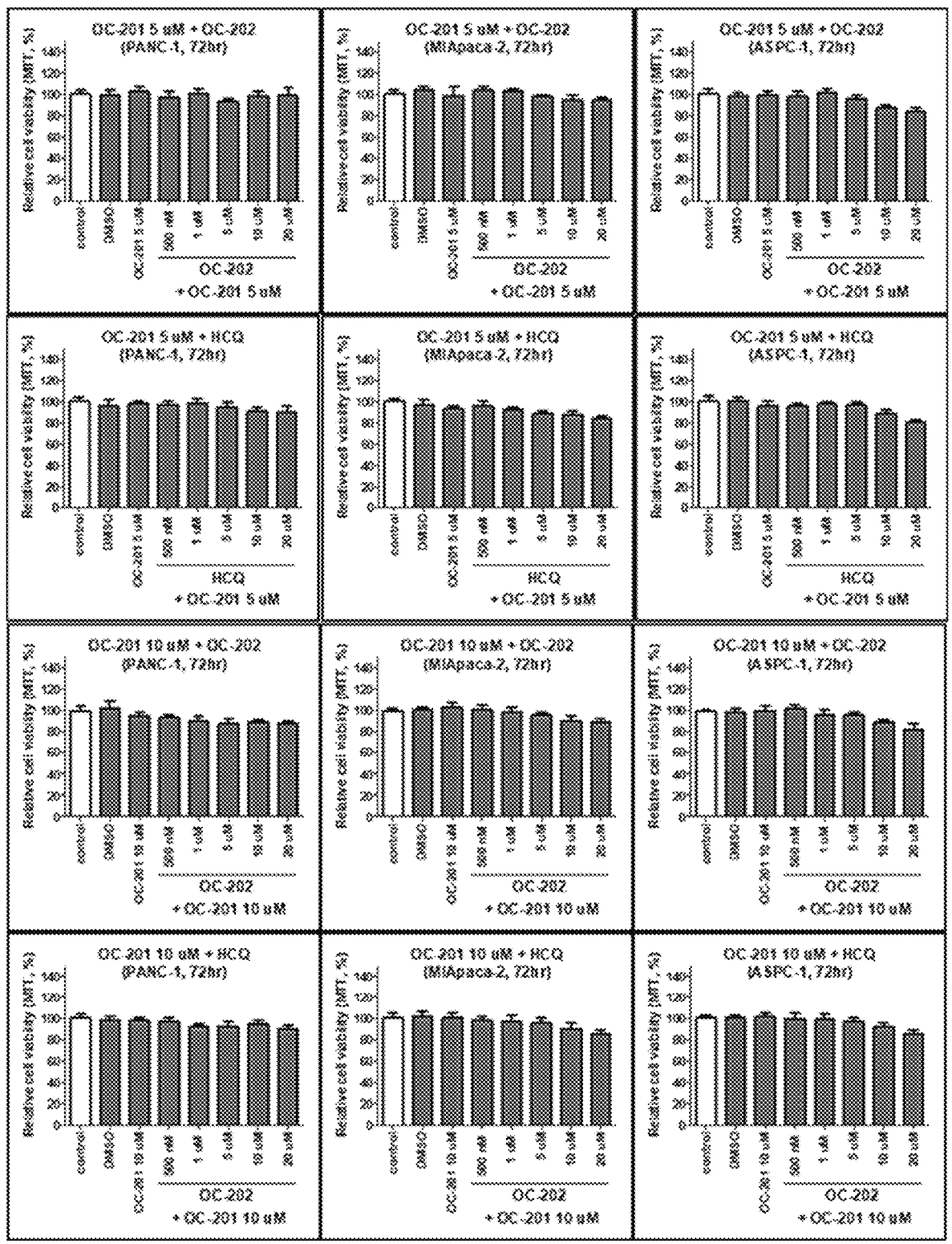
FIG. 3 is a graph showing cell survival rates of pancreatic cancer cell lines PANC-1, MIApaca-2 and ASPC-1 according to the treatment concentration of chlorphenesin carbamate (OC-201) in combination with chloroquine (OC-202) or hydroxychloroquine (HCQ).

As a result of the measurement, it was identified that even when both drugs were co-administered, no significant toxicity was observed up to a high concentration of 20 μM (FIG. 3).

Example 2. Cancer Metastasis Inhibitory Effect of Chlorphenesin 2-1. Inhibitory Effect of Chlorphenesin on Cancer Cell Migration Cancer cell metastasis should be based on cell motility. Accordingly, the migration assay method was evaluated to determine what effect chlorphenesin treatment had on changes in the mobility of important cells in cancer metastasis. In order to identify the effect of chlorphenesin, the mobility of the pancreatic cancer cell line ASPC-1 according to the treatment concentration of chlorphenesin carbamate (OC-201) was identified through a migration assay method.

Specifically, the pancreatic cancer cell line ASPC-1 was suspended in serum-free RPMI and added at $1 \times 10^5$ cells/well in the upper chamber of a 24 well transwell chamber with a polycarbonate membrane (8.0 μm pore size, Costar). Laminin (10 μg/ml) was placed in the lower well, and each cell was treated with chlorphenesin carbamate (OC-201) having 0 μM (control DMSO treatment), 5 μM and 10 μM, respectively. Cells were cultured for 18 hours in a $CO_2$ incubator at 37° C. and allowed to migrate. The cells were then fixed with 70% methyl alcohol in PBS for 30 minutes and washed three times with PBS. The cells were stained with hematoxylin (Sigma) for 10 minutes and washed with distilled water. Unmigrated cells were removed from the top surface of the membrane with a cotton swab. Membranes were removed from the chamber and fixed with Gel Mount (Biomeda, Foster City, Calif., USA). The migrated cells (cells attached to the lower surface of the membrane) were counted in a randomly selected scope in a high power field (×20).

Figure 4:
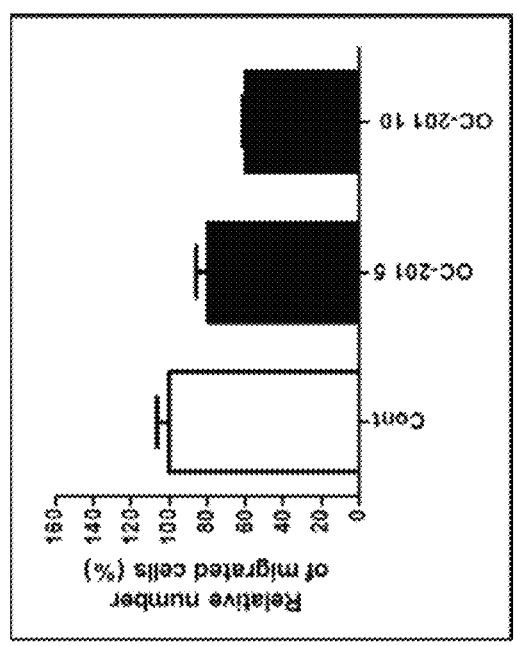
FIG. 4 is a view showing the degree of migration of ASPC-1 cells according to the treatment concentration of chlorphenesin carbamate (OC-201).
Figure 4:
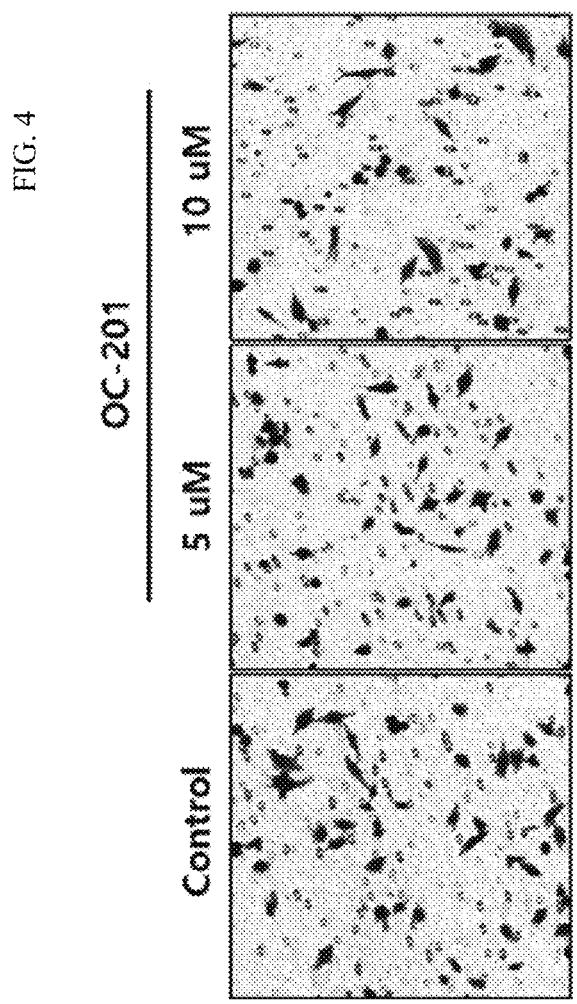

As a result, it was identified that when the ASPC-1 cell line was treated with chlorphenesin carbamate (OC-201), the mobility of pancreatic cancer cells was inhibited (FIG. 4).

In addition, in order to evaluate the mobility of cells against the pancreatic cancer cell line MIApaca-2, a transwell plate having a hole size of 8 μm was used. Cells treated with 0 μM (control DMSO treatment), 5 μM and 10 μM of the chlorphenesin carbamate (OC-201) were divided to the insert membrane thereof at $2 \times 10^5$/well, and cultured for 18 hours in a $CO_2$ incubator at 37° C. After culturing, the insert membrane was washed with PBS and fixed with 3.7% formaldehyde for 10 minutes. After fixation, the insert membrane was washed again with PBS and reacted with 100% methanol for 20 minutes. The insert membrane was washed with PBS and stained with 0.05% crystal violet for 1 hour. After staining, the insert membrane was washed with PBS, and cells that did not pass through the membrane core were removed using a cotton swab. After removing the cells, the water was dried at room temperature and the insert membrane was analyzed through a microscope.

Figure 5:
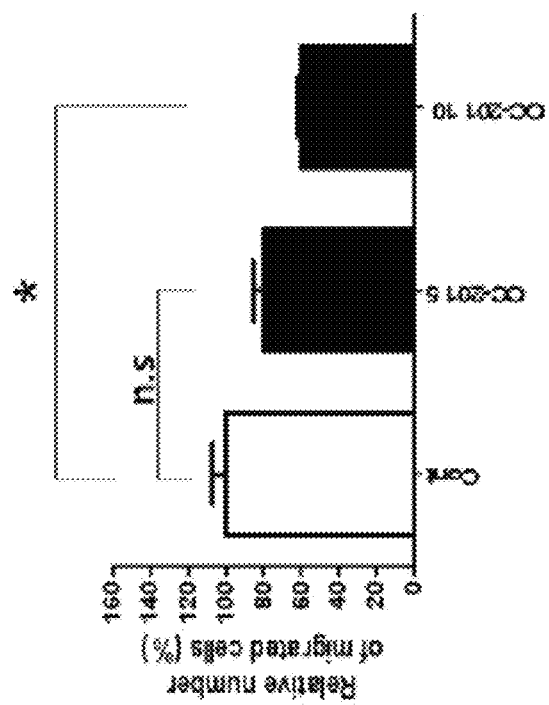
FIG. 5 is a view showing an effect on the inhibition of migration of MIApaca-2 cancer cells by chlorphenesin carbamate (OC-201).
Figure 5:
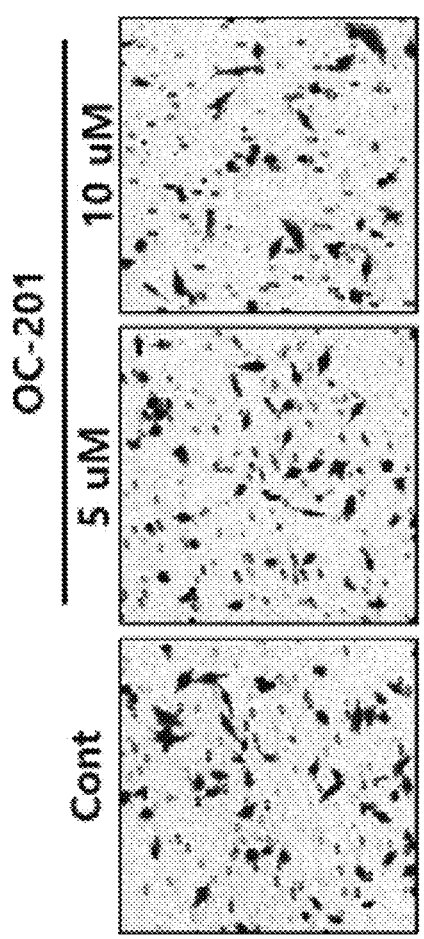

As a result, it was identified that the mobility of pancreatic cancer cells was inhibited in a concentration-dependent manner by treatment with chlorphenesin carbamate (OC-201) (FIG. 5).

2-2. Inhibitory effect of Chlorphenesin in Cancer Cell Invasion

In order to identify whether the chlorphenesin of the present disclosure inhibits the characteristics of cancer cells which pierces thin membrane surrounding the cell tissues or degrades the extracellular matrix filling the intercellular space to invade and metastasize into other parts, for chlorphenesin carbamate (OC-201), the invasion assay using matrigel simulating an extracellular matrix was performed to analyze invasiveness.

Specifically, the pancreatic cancer cell line ASPC-1 was suspended in serum-free RPMI and added at $1 \times 10^5$ cells/well in the upper chamber of a 24 well transwell chamber with a polycarbonate membrane (8.0 μm pore size, Costar). Matrigel (10 μg/ml) was placed in the lower well, and each cell was treated with a control (DMSO) and chlorphenesin carbamate (OC-201; 5 μM or 10 μM). Thereafter, cells were cultured for 18 hours in a $CO_2$ incubator at 37° C. The cells were then fixed with 70% methyl alcohol in PBS for 30 minutes and washed three times with PBS. The cells were stained with hematoxylin (Sigma) for 10 minutes and washed with distilled water. Unmigrated cells were removed from the top surface of the membrane with a cotton swab. Membranes were removed from the chamber and fixed with Gel Mount (Biomeda, Foster City, Calif., USA). The migrated cells (cells attached to the lower surface of the membrane) were counted in a randomly selected scope in a high power field (×20).

Figure 6:
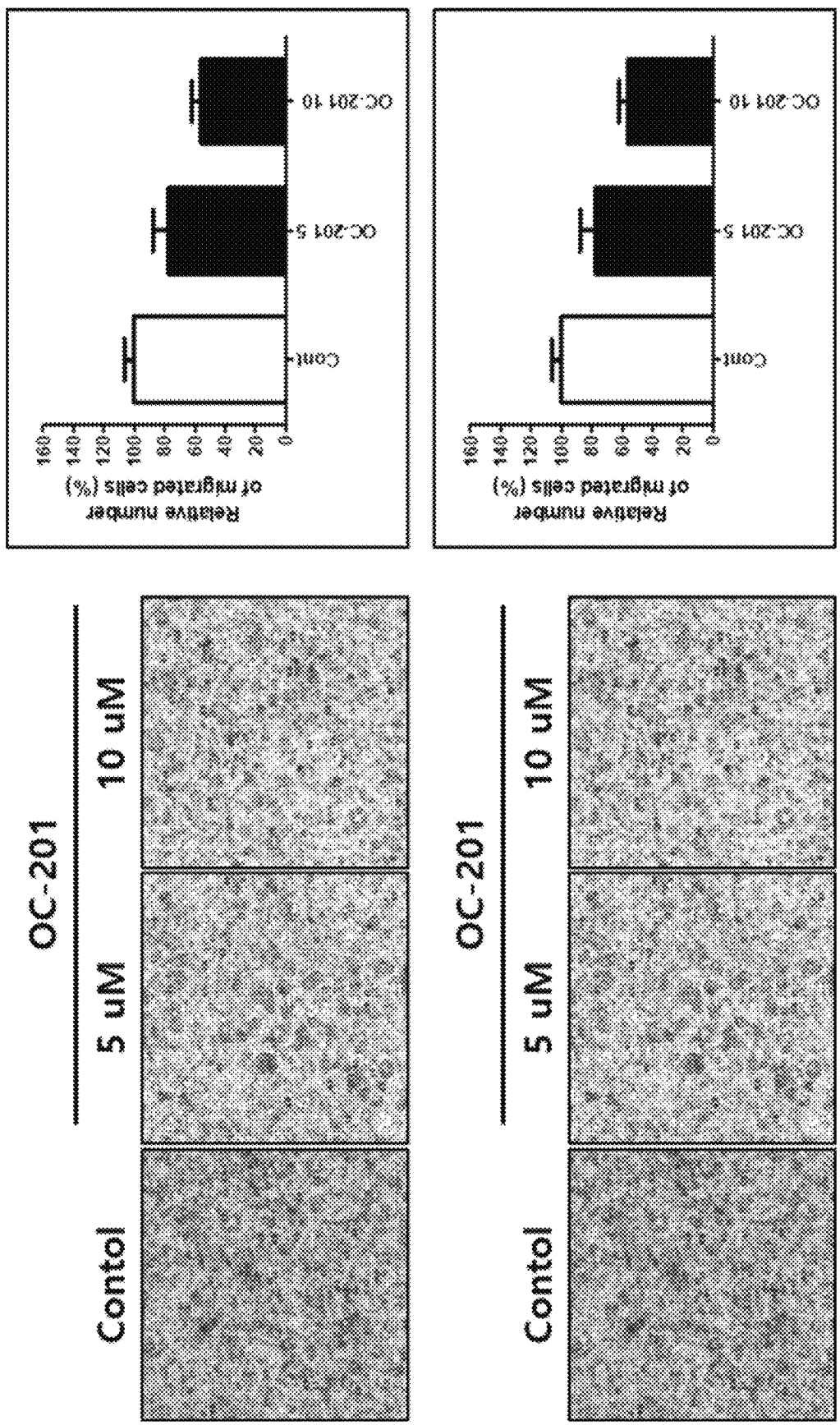
FIG. 6 is a view showing results of an invasion assay of ASPC-1 cells according to the treatment concentration of chlorphenesin carbamate (OC-201).

As a result, as shown in FIG. 6, it was identified that the invasion of the ASPC-1 cell line was inhibited by the group administered with chlorphenesin alone.

In addition, in order to identify the effect of inhibiting invasion in the pancreatic cancer cell line MIApaca-2, a boyden-chamber was used, and the membrane was coated with matrigel. Cells treated alone or in combination on an insert membrane were divided at $1 \times 10^4$/well, and cultured for 18 hours in a $CO_2$ incubator at 37° C. After culturing, the insert membrane was washed with tertiary distilled water and fixed for 10 minutes using a fixing solution. After fixation, the insert membrane was washed again using distilled water, and then was dyed with dye for 5 minutes and then washed. The dyed insert membrane was attached to a slide-glass, and cells that did not pass through the membrane core were removed. Then, the water was dried at room temperature and the insert membrane was analyzed through a microscope.

Figure 7:
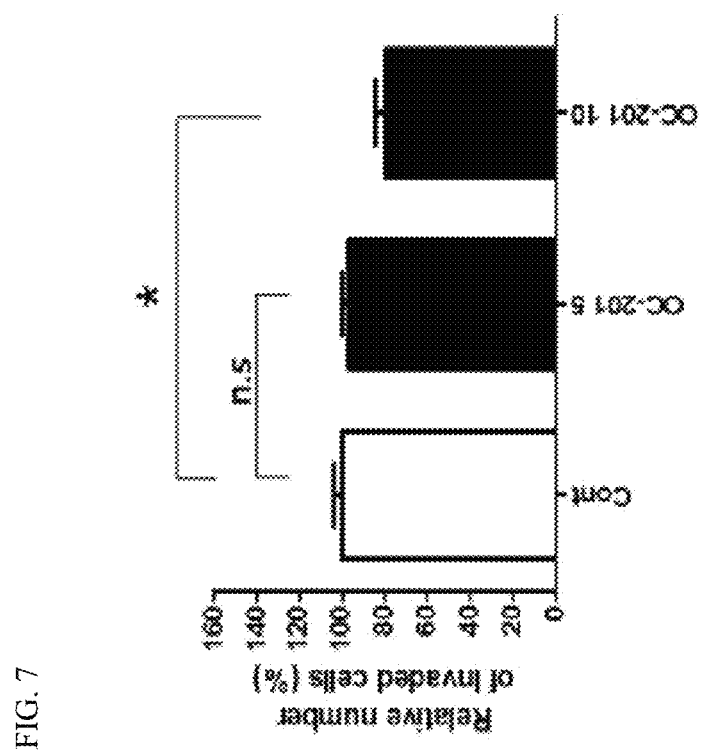
FIG. 7 is a view showing an effect on the inhibition of invasion of MIApaca-2 cancer cells by chlorphenesin carbamate (OC-201).
Figure 7:
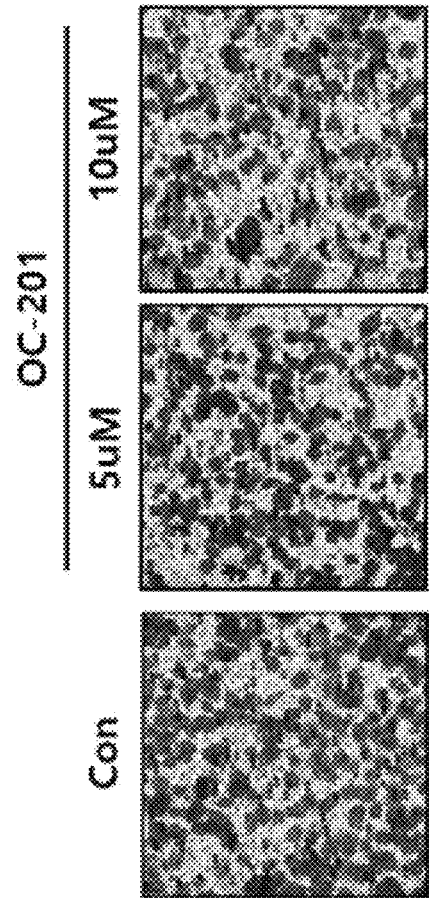

As a result, it was identified that the invasion (infiltration) of pancreatic cancer cells was reduced in the group treated with chlorphenesin carbamate (OC-201) (FIG. 7).

Accordingly, it was identified that chlorphenesin (chlorphenesin carbamate, OC-201) is not toxic to cells and may inhibit cancer cell metastasis by inhibiting cell migration and invasiveness, which is a critical cause of cancer metastasis.

Example 3. Cancer Metastasis Inhibitory Effect of Chloroquine and Hydroxychloroquine 3-1. Inhibition Effect of Cancer Cell Migration by Administration of Chloroquine and Hydroxychloroquine Alone Whether chloroquine (OC-201) and hydroxychloroquine (HCQ) induces inhibition of the mobility of the pancreatic cancer cell line ASPC-1 was identified through the migration assay method.

Specifically, the pancreatic cancer cell line ASPC-1 was suspended in serum-free RPMI and added at $1\times10^5$ cells/well in the upper chamber of a 24 well transwell chamber with a polycarbonate membrane (8.0 μm pore size, Costar). Laminin (10 μg/ml) was placed in the lower well, and each cell was treated with chloroquine (OC-201) or hydroxychloroquine (HCQ) having 0 μM (control DMSO treatment), 5 μM and 10 μM, respectively. Cells were cultured for 18 hours in a $CO_2$ incubator at 37° C. and allowed to migrate. The cells were then fixed with 70% methyl alcohol in PBS for 30 minutes and washed three times with PBS. The cells were stained with hematoxylin (Sigma) for 10 minutes and washed with distilled water. Unmigrated cells were removed from the top surface of the membrane with a cotton swab. Membranes were removed from the chamber and fixed with Gel Mount (Biomeda, Foster City, Calif., USA). The migrated cells (cells attached to the lower surface of the membrane) were counted in a randomly selected scope in a high power field (×20).

Figure 8:
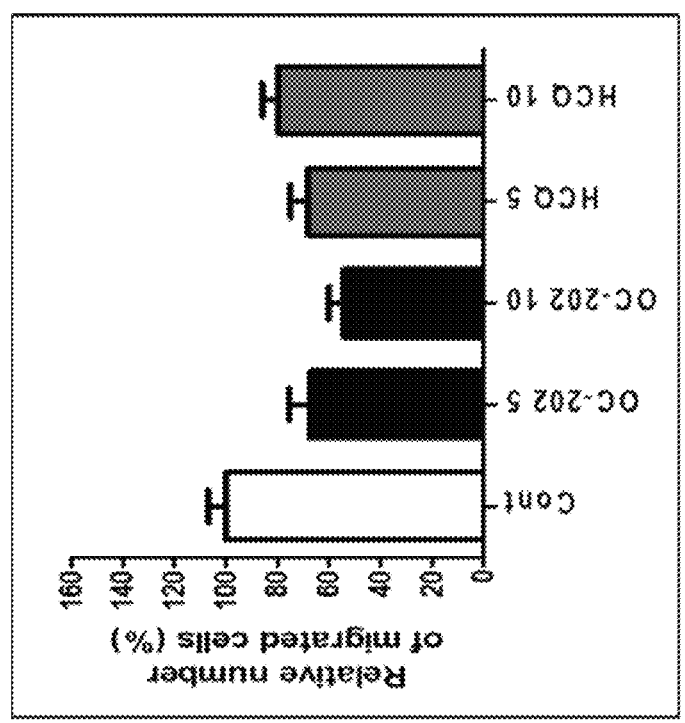
FIG. 8 is a view showing the degree of migration of ASPC-1 cells according to the treatment concentration of each of chloroquine (OC-202) and hydroxychloroquine (HCQ).
Figure 8:
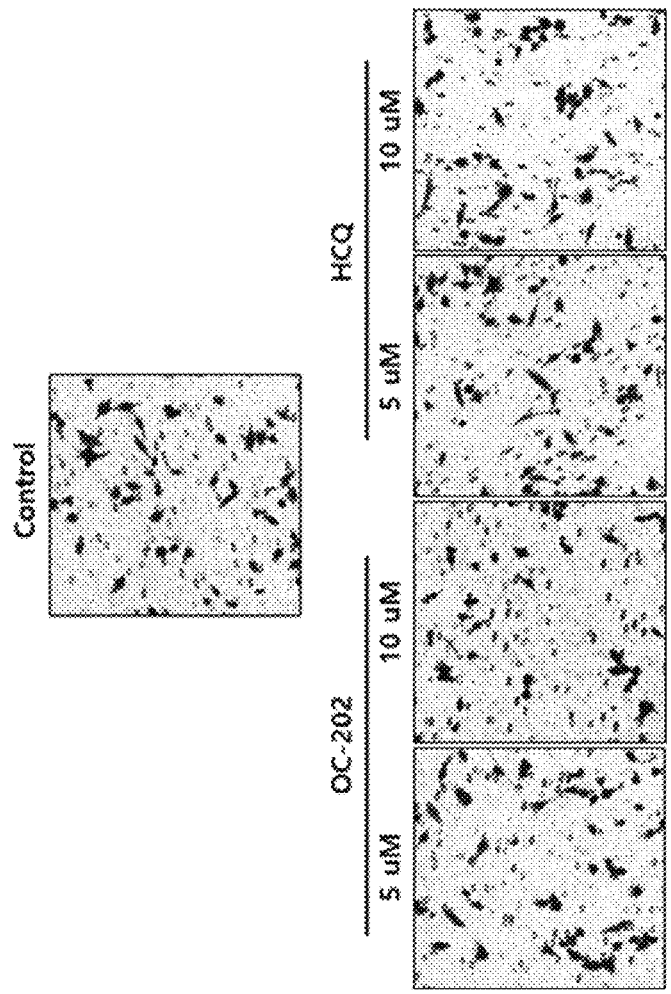

As a result of comparing the mobility of the ASPC-1 cell line between the group treated with chloroquine (OC-201) and hydroxychloroquine (HCQ) and the group not treated therewith, it was identified that cell mobility was inhibited in the group treated with the drug (FIG. 8).

In addition, chloroquine (OC-202) and hydroxychloroquine (HCQ) were treated in the pancreatic cancer cell line MIApaca-2 at 5 μM or 10 μM, respectively, and evaluated by the method of Example 2-1.

Figure 9:
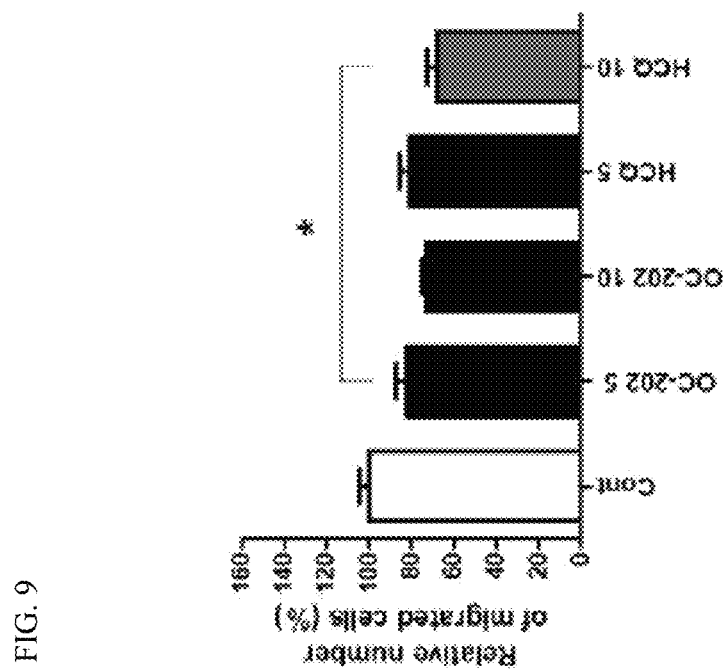
FIG. 9 is a view showing an effect on the inhibition of migration of MIApaca-2 cancer cells by chloroquine (OC-202) and hydroxychloroquine (HCQ).
Figure 9:
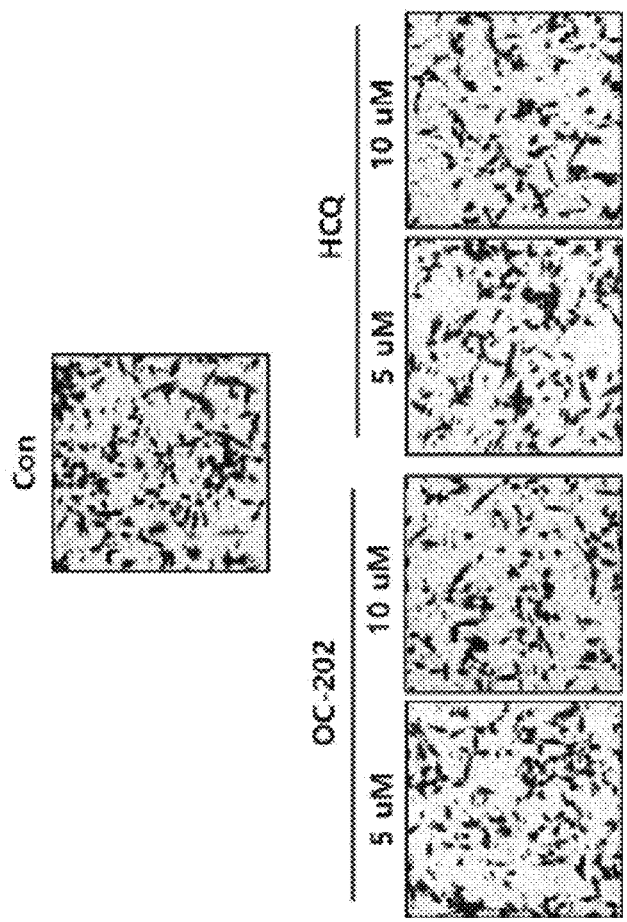

As a result, it was identified that the mobility of pancreatic cancer cells MIApaca-2 was inhibited in a concentration-dependent manner in the group treated with chloroquine (OC-202) or hydroxychloroquine (HCQ) (FIG. 9).

3-2. Inhibition of Cancer Cell Invasion by Administration of Chloroquine and Hydroxychloroquine Alone After identifying that the mobility of the pancreatic cancer cell line was inhibited by chloroquine (OC-202) and hydroxychloroquine (HCQ), an invasion assay was performed to analyze the invasiveness of the pancreatic cancer cells.

Specifically, the pancreatic cancer cell line ASPC-1 was suspended in serum-free RPMI and added at $1\times10^5$ cells/well in the upper chamber of a 24 well transwell chamber with a polycarbonate membrane (8.0 μm pore size, Costar). Matrigel (10 μg/ml) was placed in the lower well, and each cell was treated with a control (DMSO), chloroquine (OC-201), or hydroxychloroquine (HCQ) (5 μM or 10 μM, respectively). Thereafter, cells were cultured for 18 hours in a $CO_2$ incubator at 37° C. The cells were then fixed with 70% methyl alcohol in PBS for 30 minutes and washed three times with PBS. The cells were stained with hematoxylin (Sigma) for 10 minutes and washed with distilled water. Unmigrated cells were removed from the top surface of the membrane with a cotton swab. Membranes were removed from the chamber and fixed with Gel Mount (Biomeda, Foster City, Calif., USA). The migrated cells (cells attached to the lower surface of the membrane) were counted in a randomly selected scope in a high power field (×20).

Figure 10:
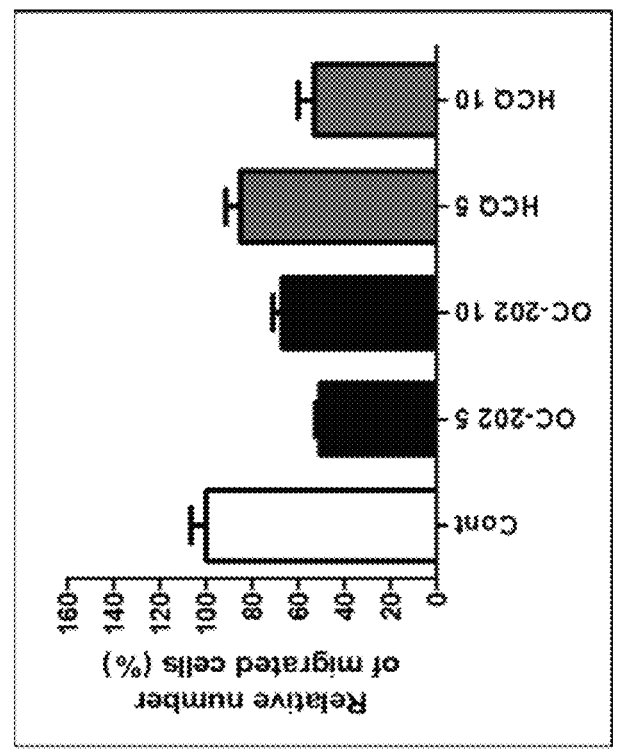
FIG. 10 is a view showing results of an invasion assay of ASPC-1 cells according to the treatment concentration of each of chloroquine (OC-202) and hydroxychloroquine (HCQ).
Figure 10:
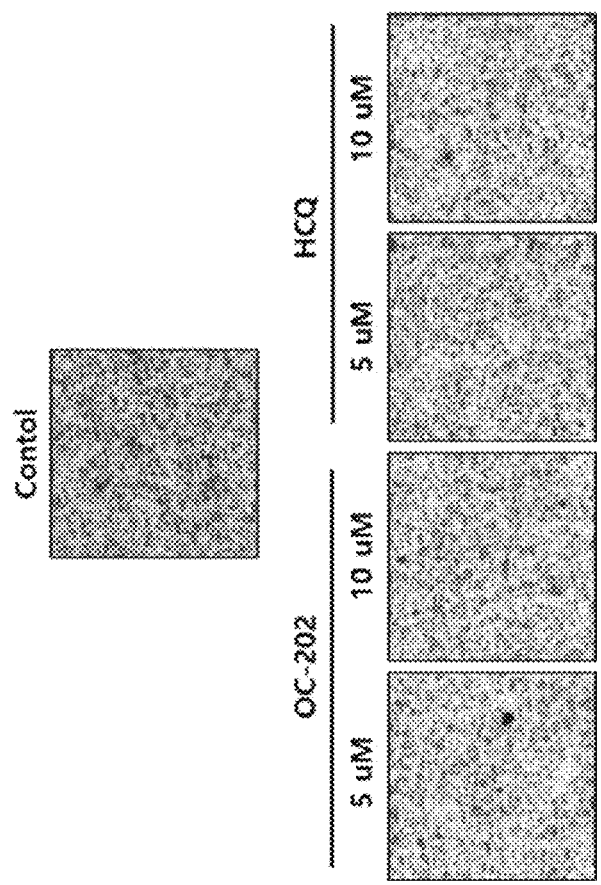

As a result, it was identified that the inhibition of the invasiveness of the pancreatic cancer cell line ASPC-1 was induced by two drugs (FIG. 10).

Figure 11:
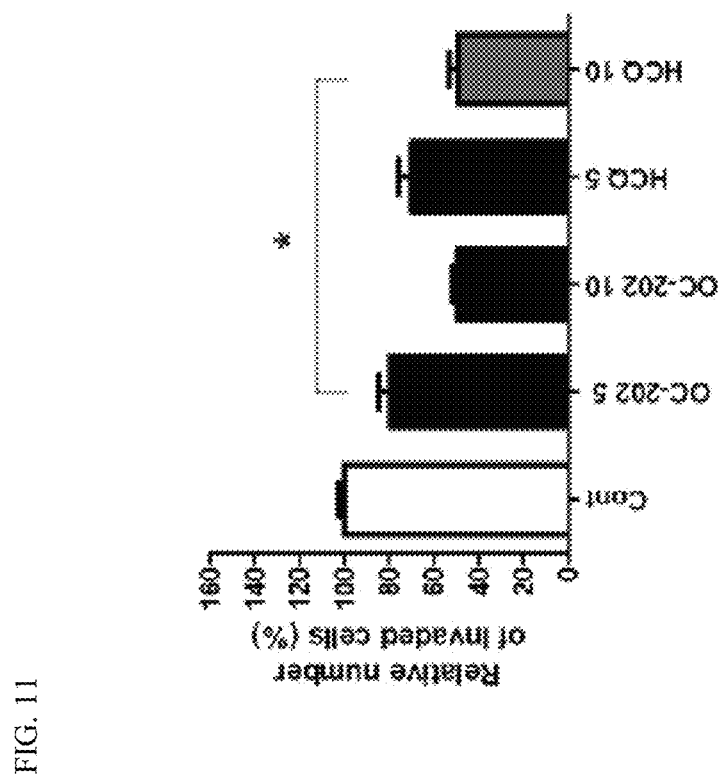
FIG. 11 is a view showing an effect on the inhibition of invasion of MIApaca-2 cancer cells by chloroquine (OC-202) and hydroxychloroquine (HCQ).
Figure 11:
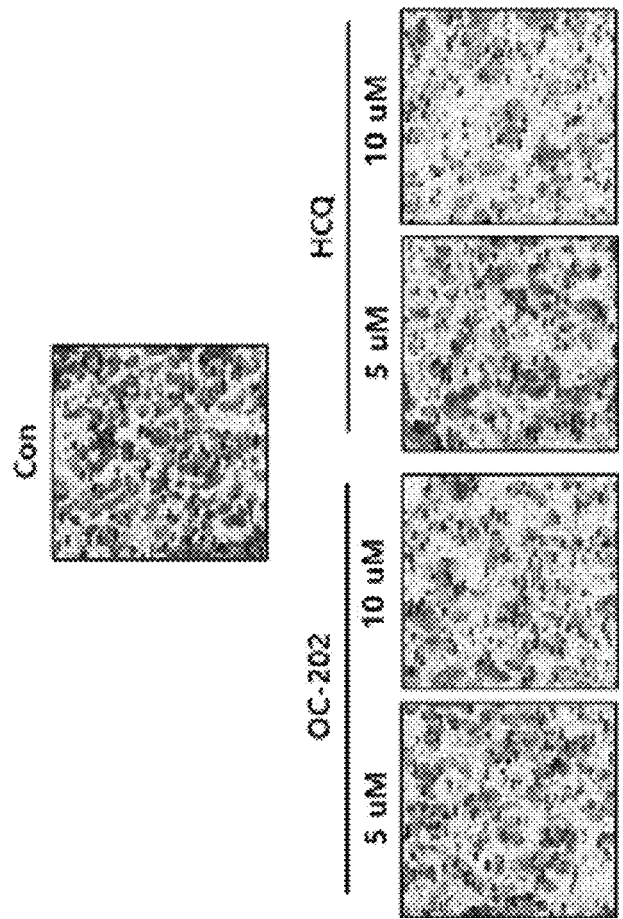

In addition, chloroquine (OC-202) and hydroxychloroquine (HCQ) were treated in the pancreatic cancer cell line MIApaca-2 at 5 μM or 10 μM, respectively, and invasiveness was identified by the method of Example 2-2. As a result, it was identified that in the group treated with chloroquine (OC-202) or hydroxychloroquine (HCQ), the infiltration of pancreatic cancer cells was significantly increased in a concentration-dependent manner (FIG. 11).

Example 4. Cancer Metastasis Inhibitory Effect of Complex 4-1. Inhibitory Effect of Cancer Cell Migration by Combination Administration The effect of the combination treatment of chlorphenesin and chloroquine (OC-202) or hydroxychloroquine (HCQ) on changes in cell mobility and invasiveness, which is a critical cause of cancer metastasis, was evaluated through the migration assay method.

Specifically, the pancreatic cancer cell line ASPC-1 was suspended in serum-free RPMI and added at $1\times10^5$ cells/well in the upper chamber of a 24 well transwell chamber with a polycarbonate membrane (8.0 μm pore size, Costar). Laminin (10 μg/ml) was placed in the lower well, and each cell was treated with chlorphenesin carbamate (OC-201) having 5 μM or 10 μM and chloroquine (OC-201) or hydroxychloroquine (HCQ) having 0 μM (control DMSO treatment), 5 μM or 10 μM, respectively. Cells were cultured for 18 hours in a $CO_2$ incubator at 37° C. and allowed to migrate. The cells were then fixed with 70% methyl alcohol in PBS for 30 minutes and washed three times with PBS. The cells were stained with hematoxylin (Sigma) for 10 minutes and washed with distilled water. Unmigrated cells were removed from the top surface of the membrane with a cotton swab. Membranes were removed from the chamber and fixed with Gel Mount (Biomeda, Foster City, Calif., USA). The migrated cells (cells attached to the lower surface of the membrane) were counted in a randomly selected scope in a high power field (×20).

Figure 12:
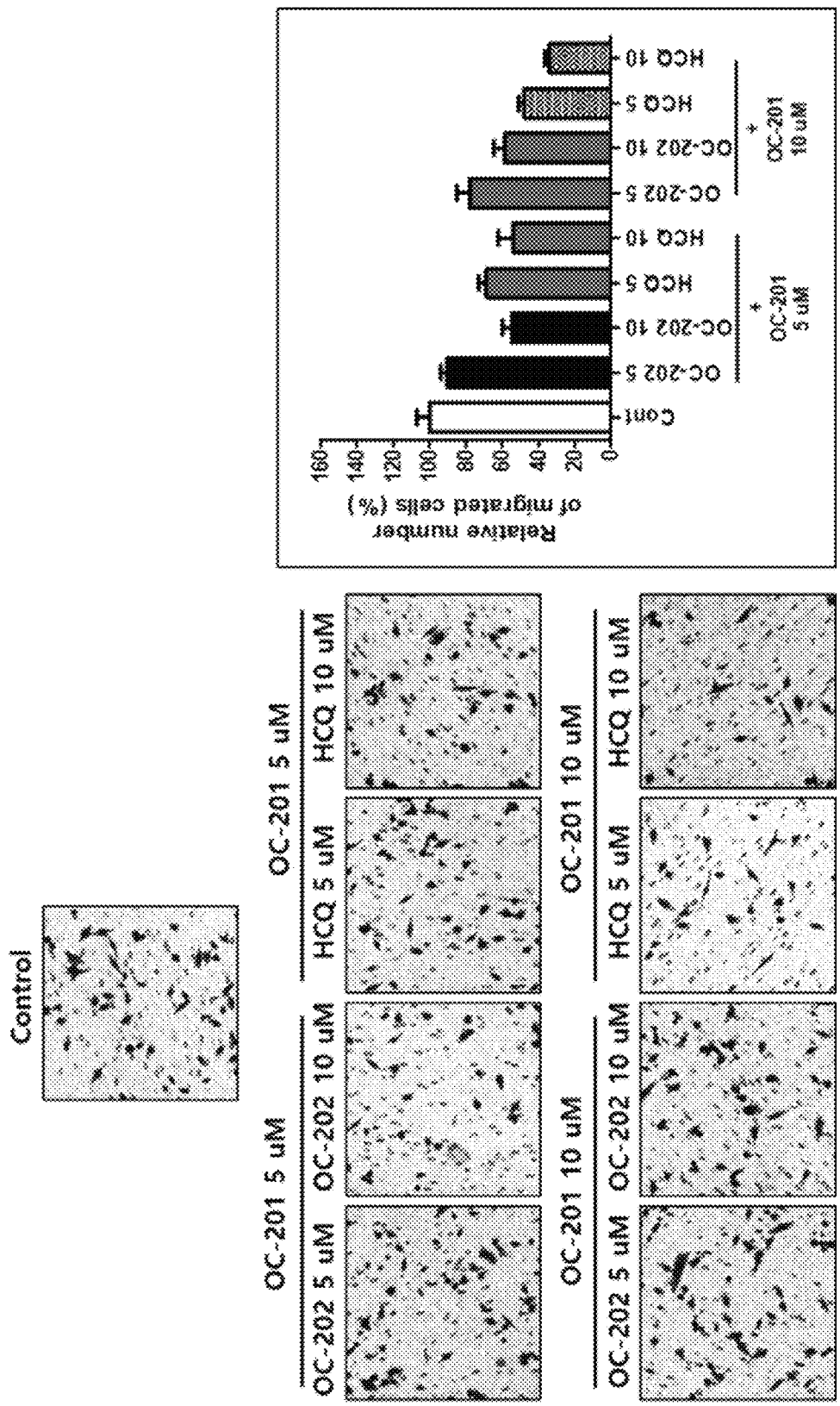
FIG. 12 is a view showing the degree of migration of ASPC-1 cells according to the treatment concentration of chlorphenesin carbamate (OC-201) in combination with chloroquine (OC-202) or hydroxychloroquine (HCQ).

It was identified that cell mobility was inhibited when chloroquine and hydroxychloroquine were treated in combination with chlorphenesin. In particular, when chlorphenesin carbamate and hydroxychloroquine were treated in combination, the inhibition of mobility was significantly increased synergistically (synergistic action) (FIG. 12).

In addition, the pancreatic cancer cell line MIApaca-2 was treated in combination with chlorphenesin carbamate (5 μM or 10 μM)+chloroquine (5 μM or 10 μM) or chlorphenesin carbamate (5 μM or 10 μM)+hydroxychloroquine (5 μM or 10 μM), respectively treatment, and cancer cell mobility was evaluated by the method of Example 2-1 above.

Figure 13:
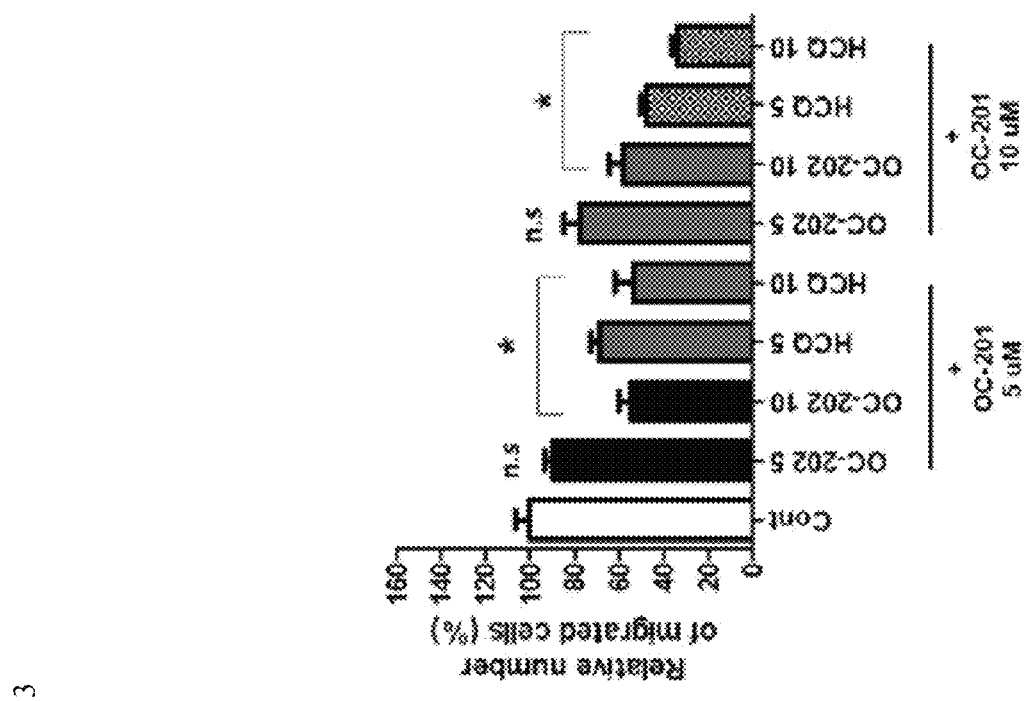
FIG. 13 is a view showing an effect on the inhibition of migration of MIApaca-2 cancer cells by the treatment of chlorphenesin carbamate (OC-201) in combination with chloroquine (OC-202) or hydroxychloroquine (HCQ).
Figure 13:
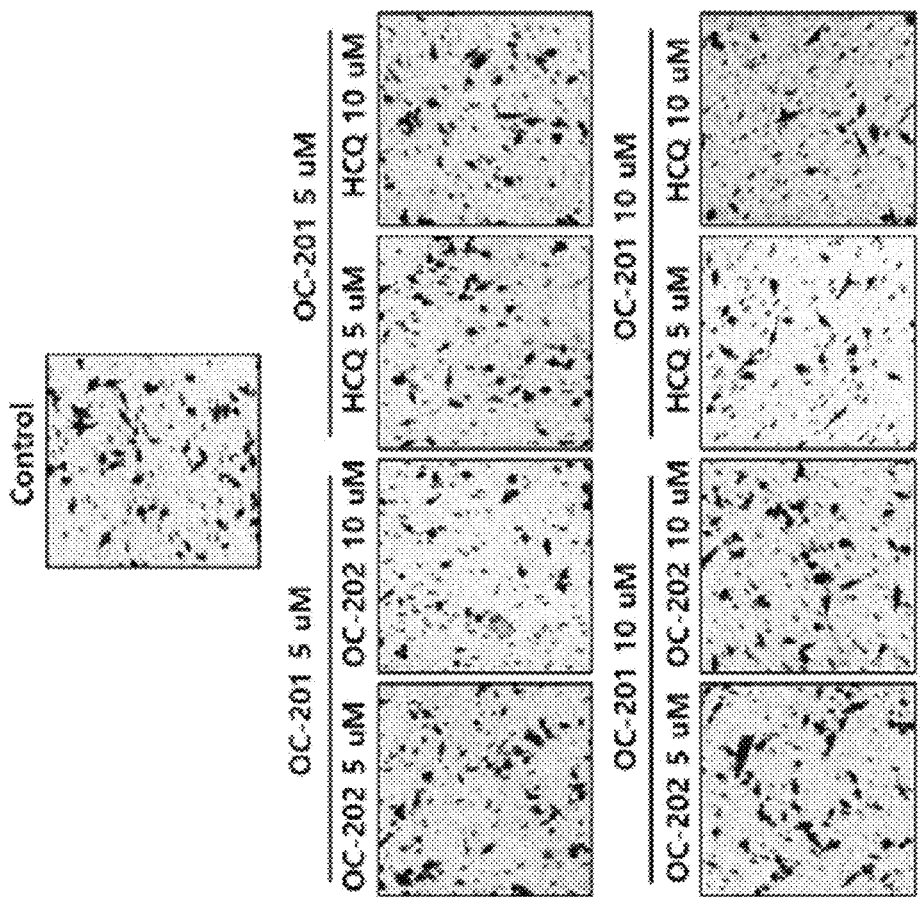

As a result, when chlorphenesin carbamate and chloroquine or hydroxychloroquine were treated in combination, it has been shown to inhibit cancer cell mobility synergistically in a concentration-dependent manner. In particular, when chlorphenesin carbamate and hydroxychloroquine were treated in combination, the inhibition of mobility was significantly increased synergistically (FIG. 13).

4-2. Inhibitory Effect of Cancer Cell Invasion by Combination Administration

After identifying that the mobility of pancreatic cancer cell lines was inhibited by combination treatment of chlorphenesin and chloroquine (OC-202) or hydroxychloroquine (HCQ), invasion assay was performed to identify the invasiveness of pancreatic cancer cells.

Specifically, the pancreatic cancer cell line ASPC-1 was suspended in serum-free RPMI and added at $1 \times 10^5$ cells/well in the upper chamber of a 24 well transwell chamber with a polycarbonate membrane (8.0 µm pore size, Costar). Matrigel (10 µg/ml) was placed in the lower well, and each cell was treated with a control (DMSO), chlorphenesin carbamate (OC-201) having 5 µM or 10 µM and chloroquine (OC-201) or hydroxychloroquine (HCQ) having 5 µM or 10 µM. Thereafter, cells were cultured for 18 hours in a $CO_2$ incubator at 37° C. The cells were then fixed with 70% methyl alcohol in PBS for 30 minutes and washed three times with PBS. The cells were stained with hematoxylin (Sigma) for 10 minutes and washed with distilled water. Unmigrated cells were removed from the top surface of the membrane with a cotton swab. Membranes were removed from the chamber and fixed with Gel Mount (Biomeda, Foster City, Calif., USA). The migrated cells (cells attached to the lower surface of the membrane) were counted in a randomly selected scope in a high power field (×20).

Figure 14:
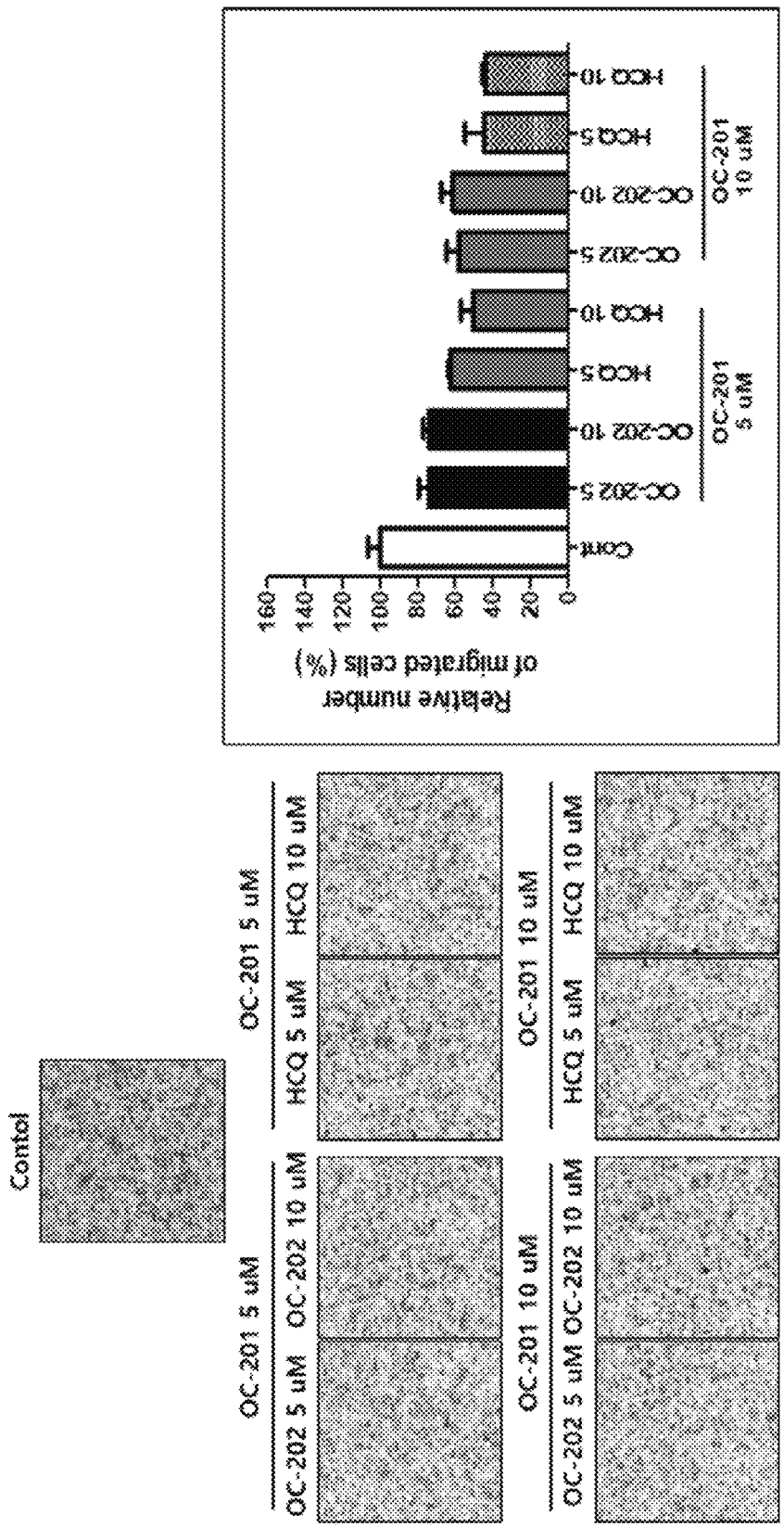
FIG. 14 is a view showing results of an invasion assay of ASPC-1 cells according to the treatment concentration of chlorphenesin carbamate (OC-201) in combination with chloroquine (OC-202) or hydroxychloroquine (HCQ).

As a result, it was identified that the invasion of pancreatic cancer cell lines was inhibited when chloroquine and hydroxychloroquine were treated in combination with chlorphenesin. In particular, a synergistic action was shown for the inhibition of invasiveness by combination treatment of chlorphenesin and hydroxychloroquine (FIG. 14).

In addition, the pancreatic cancer cell line MIApaca-2 was treated in combination with chlorphenesin carbamate (5 µM or 10 µM)+chloroquine (5 µM or 10 µM) or chlorphenesin carbamate (5 µM or 10 µM)+hydroxychloroquine (5 µM or 10 µM), respectively treatment, and the degree of cancer cell invasion was evaluated by the method of Example 2-2 above.

Figure 15:
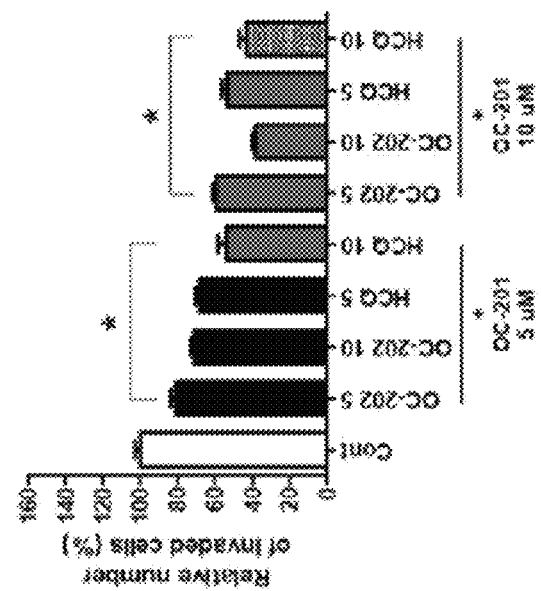
FIG. 15 is a view showing an effect on the inhibition of invasion of MIApaca-2 cancer cells by the treatment of chlorphenesin carbamate (OC-201) in combination with chloroquine (OC-202) or hydroxychloroquine (HCQ).
Figure 15:
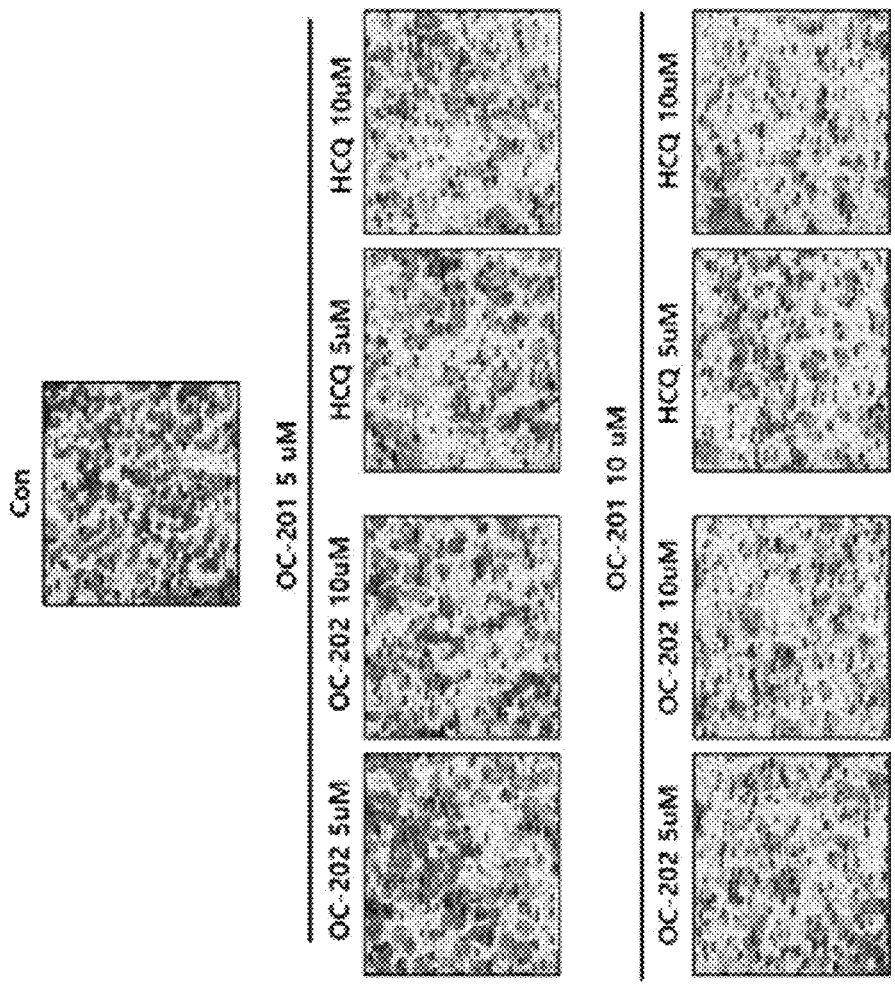

As a result, it was found that the invasiveness of pancreatic cancer cell lines was inhibited synergistically in a concentration-dependent manner by combination treatment of chlorphenesin carbamate and chloroquine or hydroxychloroquine. In particular, when chlorphenesin carbamate and hydroxychloroquine were treated in combination, a synergistic action was identified for the inhibition of invasiveness (FIG. 15).

Example 5. Identification of Cancer Metastasis Inhibition Mechanism of Complex

Since cancer cells separated from the primary tumor have the characteristics of mesenchymal cells and are newly established in other sites via blood vessels, the metastasis process is completed. Since epithelial to mesenchymal transition (EMT) is known as an important signaling pathway in cancer metastasis, in order to identify whether the expression of epithelial mesenchymal cell-specific markers in cancer cells is changed by treatment with chlorphenesin, chloroquine or hydroxychloroquine alone or in combination, after treatment with chlorphenesin carbamate (OC-201), chloroquine (OC-202) or hydroxychloroquine (HCQ) alone or in combination with pancreatic cancer cell lines (Miapaca-2, Panc-1 and ASPC-1), the expression of epithelial cell marker ZO-1, and mesenchymal cell markers ZEB1, Snail and N-cadherin was identified by Western blot analysis. In addition, the expression of AKT regulating the epithelial mesenchymal transition was also identified.

Figure 16:
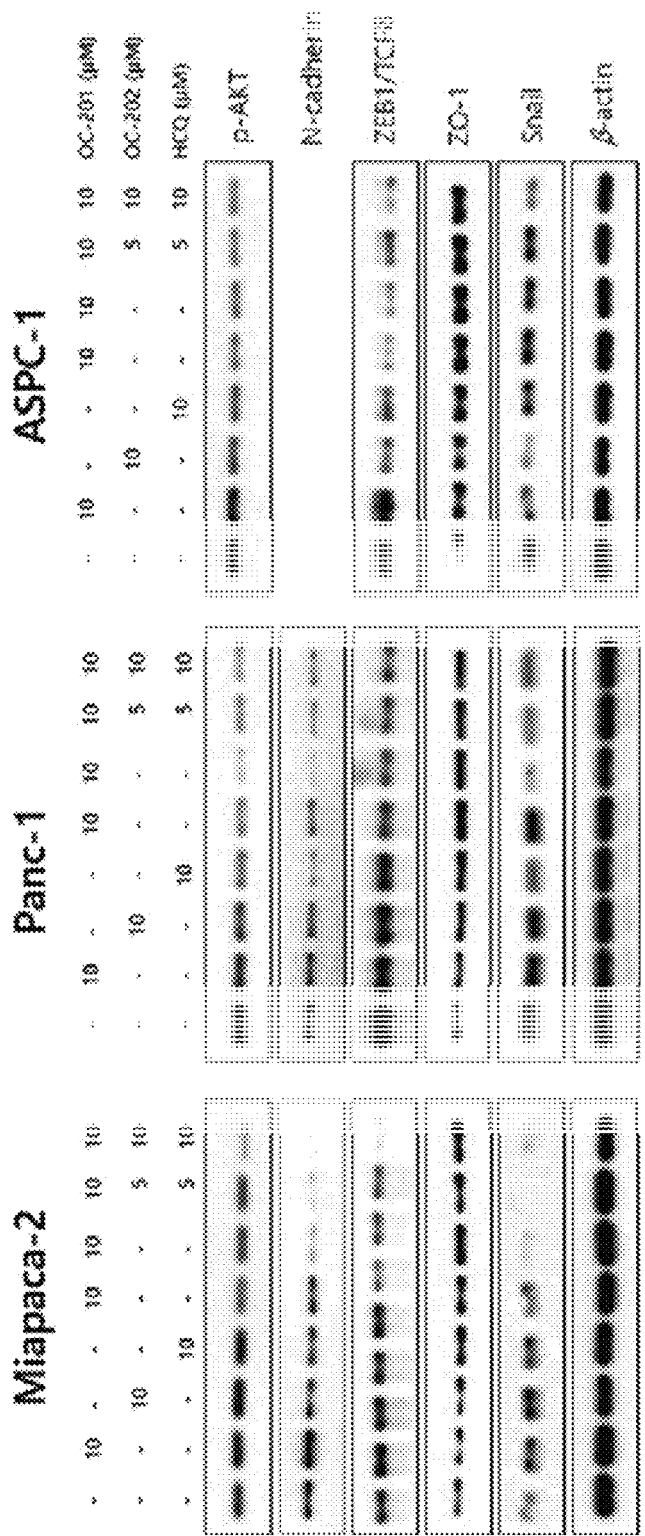
FIG. 16 is a view showing a mechanism of inhibiting cancer metastasis by chlorphenesin carbamate (OC-201), chloroquine (OC-202) and/or hydroxychloroquine (HCQ).

As a result, the expression of ZO-1 was found to be increased by treatment with chlorphenesin carbamate (OC-201), chloroquine (OC-202), or hydroxychloroquine (HCQ) alone or in combination. The mesenchymal cell markers ZEB1, Snail and N-cadherin were found to be decreased in expression by treatment with chlorphenesin carbamate (OC-201), chloroquine (OC-202) or hydroxychloroquine (HCQ) alone or in combination (FIG. 16). In addition, the expression of AKT was also found to be decreased by treatment with chlorphenesin carbamate (OC-201), chloroquine (OC-202), or hydroxychloroquine (HCQ) alone or in combination (FIG. 16). Accordingly, it was identified that OC-201, OC-202 and/or HCQ regulated epithelial mesenchymal cell transition by inhibiting the AKT signaling mechanism.

Example 6. Identification of Effect on Cancer Metastasis in Animals 2-1. Experimental Design In order to verify the anti-metastatic effect of the combination treatment of hydroxychloroquine and chlorphenesin, an in-vivo cancer metastasis model was made. Therethrough, the effect on cancer metastasis was evaluated when the drug was administered alone or in combination. Specifically, the MIAPaCa-2 induced hepatic metastasis model was made using the pancreatic cancer cell line MIAPaCa-2, and the drug was administered to verify whether it had an anti-metastatic effect.

For each of chlorphenesin and hydroxychloroquine, the required amount of the test substance was weighed with an electronic balance (Sartorius, Cat no. TE214S), and put into a preparation container. After adding some PBS, it was stirred with a vortex mixer and dissolved. PBS was added to prepare a set concentration (3 mg/ml). The diluted drug was stored at −20° C. and prepared immediately before administration.

Animal testing in this example was approved by the Ethics Committee for Animal Experiments at Kyunghee University, South Korea (approval number: KHUASP(SE)-18-001), and the experimentation was conducted in compliance with the animal ethics of the Animal Protection Act (Act No. 16977, Feb. 11, 2020, partially revised) and the Laboratory Animal Act (Act No. 15944, Dec. 11, 2018, partially revised). All animals used in the experiment were bred within a 12 h light cycle, and allowed free access to water and feed.

Figure 17:
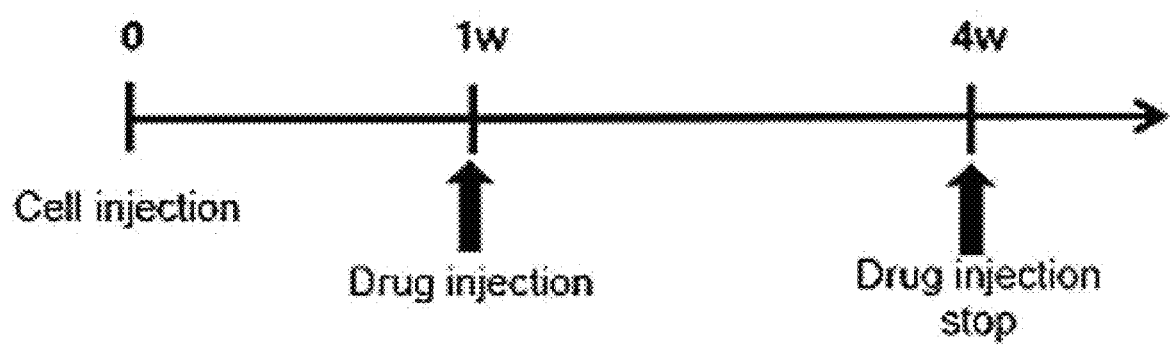
FIG. 17 is a schematic view showing an experimental design showing a liver metastasis effect of a drug using an MIAPaCa-2 induced liver metastasis model.

Specifically, $1 \times 10^5$ MIA PaCa-2 cells per mouse in the spleen of 8-week-old male BALB/c nude mice (Nara Biotech, 18 g to 24 g, 32 mice) after a one-week stabilization period were dissolved in 100 µl of serum-free DMEM and injected using a 26G syringe (KoreaVaccine, Cat no. 27-00024-01). Thereafter, the drug was administered with a one-week stabilization period. The dose of each drug was set in consideration of the existing data such as pharmacokinetic parameters, toxic dose, and no-noxious dose (NOAEL) of the drug, and low-dose and high-dose combined doses were set to identify and compare the effects of combination administration of drugs. Intraperitoneal administration was selected for rapid blood concentration reach and accurate dose administration, weight was measured every day (5 times a week) during a one-week stabilization period, and drug dose was set based thereon. Seven days after administration of the cells, chlorphenesin (OC-201) and hydroxychloroquine (OC-202) were intraperitoneally injected for 4 weeks either singly or in combination. A schematic diagram of the pancreatic cancer cell line spleen injection liver metastasis model experiment is shown in FIG. 17, and each test group and administration dose are shown in Table 1 below.

TABLE 1

| | Test group | Dosage (mg/kg) | injection volume (mL/kg) | Number of animals (animal number) |
|---|---|---|---|---|
| G1 | Normal control group | 0 | 10 | 6 |
| G2 | chlorphenesin | 10 | 10 | 6 |
| G3 | chlorphenesin | 30 | 10 | 6 |
| G4 | hydroxychloroquine | 30 | 10 | 7 |
| G5 | Combination administration group | 30 each | 10 | 7 |

General symptoms were observed once/day during the experiment period, and the presence of moribund or dead animals was checked. The body weight of each subject was measured on the day of group separation and the day of administration. After administration for 4 weeks, on the day of tissue extraction, all animals were anesthetized by inhalation with isoflurane and then euthanized and sacrificed through cervical dislocation to obtain liver and spleen tissues. The extracted tissue was washed twice with PBS, fixed in 10% PFA solution, dehydrated and paraffinized, and then stored at room temperature or low temperature (4□C). After paraffinization and sectioning, hematoxylin & eosin staining (H&E staining) was performed to observe the number of nodules in the liver to evaluate the metastasis inhibitory effect of the drug. After the equal variance test of each experimental group and control group, the mean difference between each group was analyzed through an independent sample T test, and the reliability of the mean difference between the groups was expressed as p value.

Figure 18:
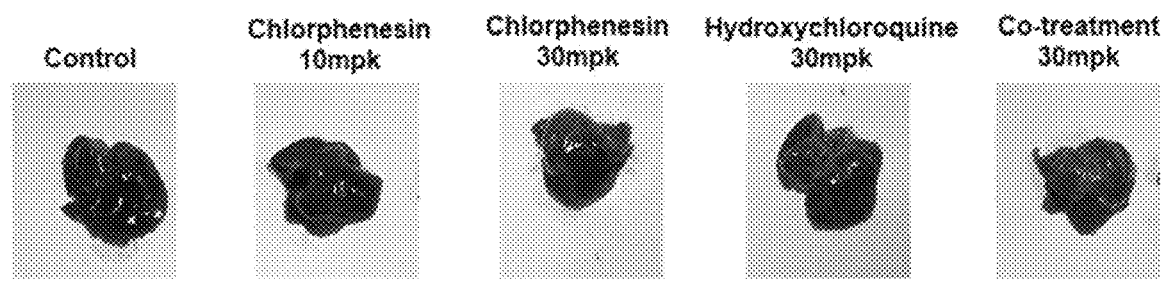
FIG. 18 is photographs capturing liver tissues according to chlorphenesin, hydroxychloroquine, or a co-treatment thereof in an MIAPaCa-2 induced liver metastasis model.
Figure 19:
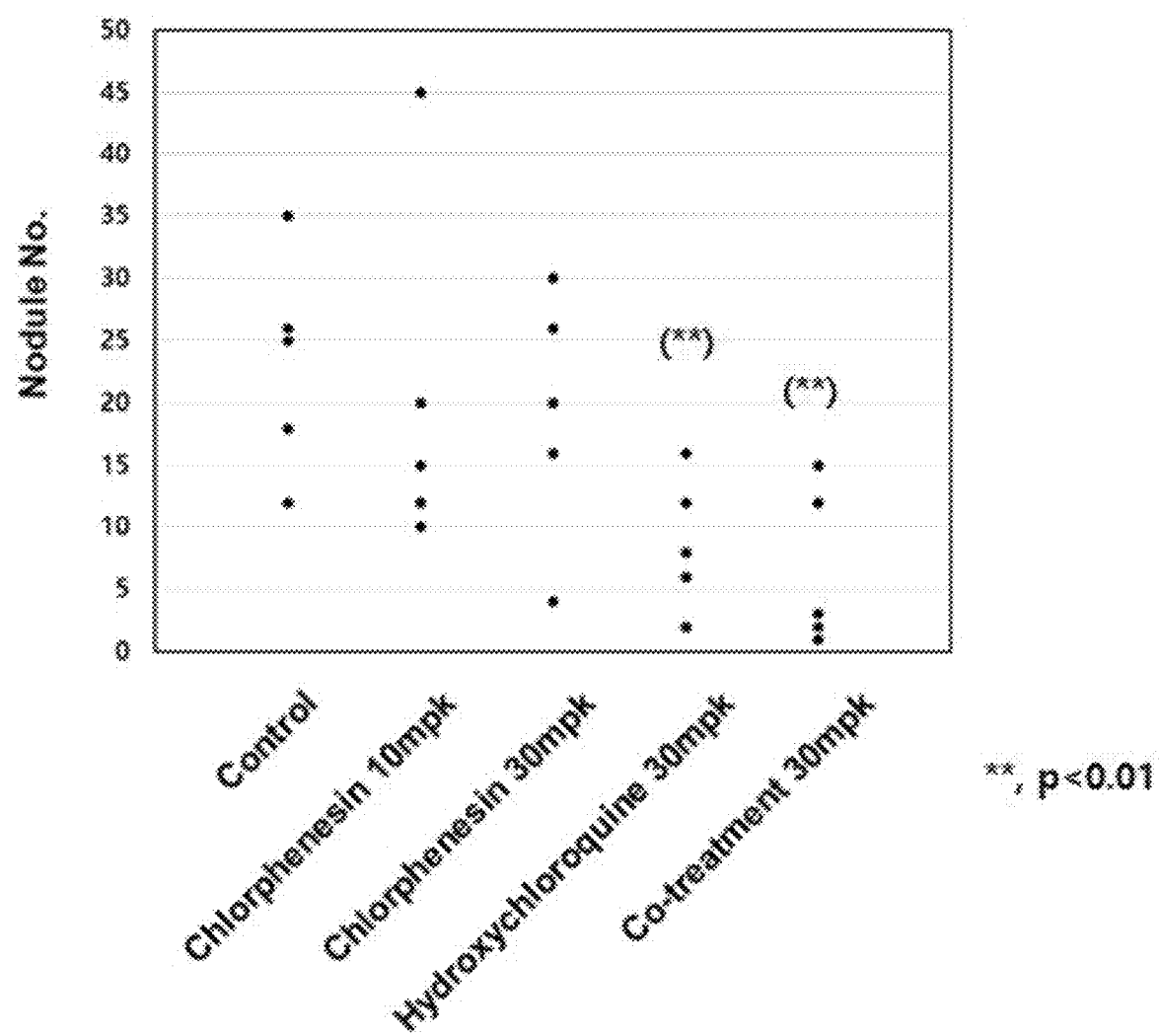
FIG. 19 is a quantification graph of the number of nodules in liver tissue according to chlorphenesin, hydroxychloroquine, or a co-treatment thereof in an MIAPaCa-2 induced liver metastasis model.

As a result of observing the number of nodules in liver tissue according to the administration of chlorphenesin and hydroxychloroquine alone or in combination, when the drug was administered alone or in combination, a statistically significant decrease in the number of nodules was observed compared to the control group, and it was identified that the drug had an effect of reducing cancer metastasis to the liver. In particular, the combination administration group showed a tendency to have a smaller number of nodules, and when chlorphenesin and hydroxychloroquine were treated in combination, a synergistic action was observed, identifying that a superior therapeutic effect could be seen compared to single administration (FIGS. 18 and 19).

What is claimed is:

1. A method for inhibiting metastasis or invasion of cancer, or treating cancer, comprising administering a composition comprising a combination of (i) chlorphenesin or chlorphenesin carbamate and (ii) hydroxychloroquine, or a pharmaceutically acceptable salt thereof as an active ingredient to a subject in need thereof,
wherein the cancer is colorectal cancer, pancreatic cancer or biliary tract cancer.

2. The method of claim 1, wherein the hydroxychloroquine is included in the form of hydroxychloroquine sulfate.

* * * * *